US011211093B2

(12) United States Patent
Miranda Gavillan et al.

(10) Patent No.: US 11,211,093 B2
(45) Date of Patent: Dec. 28, 2021

(54) SYSTEM FOR PROVIDING AN ACCLIMATION ENCLOSURE FOR A DATA STORAGE LIBRARY

(71) Applicant: International Business Machines Corporation, Armonk, NY (US)

(72) Inventors: Jose G. Miranda Gavillan, Tucson, AZ (US); Brian G. Goodman, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/588,093

(22) Filed: Sep. 30, 2019

(65) Prior Publication Data
US 2020/0027482 A1 Jan. 23, 2020

Related U.S. Application Data

(63) Continuation of application No. 15/460,441, filed on Mar. 16, 2017, now Pat. No. 10,431,254.

(51) Int. Cl.
| | |
|---|---|
| *G11B 23/02* | (2006.01) |
| *G11B 15/68* | (2006.01) |
| *G11B 33/14* | (2006.01) |

(52) U.S. Cl.
CPC ............. *G11B 15/68* (2013.01); *G11B 33/14* (2013.01)

(58) Field of Classification Search
CPC .... E04B 1/34384; E04B 1/343; E04B 2/7407; H05K 7/1497

(Continued)

(56) References Cited

U.S. PATENT DOCUMENTS

| 4,831,476 A | 5/1989 | Pisczak |
| 4,838,911 A | 6/1989 | Robertson |

(Continued)

FOREIGN PATENT DOCUMENTS

| CN | 102192631 A | 9/2011 |
| CN | 102407663 A | 4/2012 |

(Continued)

OTHER PUBLICATIONS

Office Action dated Aug. 5, 2020 received in U.S. Appl. No. 16/557,099, 47 pages.

(Continued)

*Primary Examiner* — Vivek K Shirsat
*Assistant Examiner* — Ko-Wei Lin
(74) *Attorney, Agent, or Firm* — Scully, Scott, Murphy & Presser, P.C.

(57) ABSTRACT

An enclosure configured to at least partially surround at least one access opening that permits access to an interior of a data storage library, wherein the enclosure includes at least one side surface configured to surround the at least one access opening to form a chamber and to permit access to the interior of the data storage library. The enclosure also includes at least one access opening in the at least one side surface to permit access to an interior of the chamber, wherein the enclosure is configured to selectively acclimate the chamber between environmental conditions exterior of the enclosure and environmental conditions of the interior of the data storage library.

20 Claims, 16 Drawing Sheets

(58) Field of Classification Search
USPC .......................................... 454/184, 365–366
See application file for complete search history.

(56) References Cited

U.S. PATENT DOCUMENTS

| | | | |
|---|---|---|---|
| 5,278,708 A | 1/1994 | Apple et al. | |
| 5,449,229 A | 9/1995 | Aschenbrenner et al. | |
| 5,940,354 A | 8/1999 | Inoue | |
| 6,347,020 B1 | 2/2002 | Carpenter et al. | |
| 6,366,982 B1 | 4/2002 | Suzuki et al. | |
| 6,409,450 B1 | 6/2002 | Ostwald et al. | |
| 6,457,928 B1 | 10/2002 | Ryan | |
| 6,467,285 B2 | 10/2002 | Felder et al. | |
| 6,478,524 B1 | 11/2002 | Malin | |
| 6,494,663 B2 | 12/2002 | Ostwald et al. | |
| 6,537,013 B2 | 3/2003 | Emberty et al. | |
| 6,563,771 B1 | 5/2003 | Debiez | |
| 6,661,596 B2 | 12/2003 | Chliwnyj et al. | |
| 6,676,026 B1 | 1/2004 | McKinley et al. | |
| 6,676,505 B2 | 1/2004 | Behl | |
| 6,854,275 B2 | 2/2005 | Evans | |
| 6,896,612 B1 | 5/2005 | Novotny et al. | |
| 6,924,981 B2 | 8/2005 | Chu et al. | |
| 6,940,716 B1 | 9/2005 | Korinsky et al. | |
| 7,039,924 B2 | 5/2006 | Goodman et al. | |
| 7,106,538 B2 | 9/2006 | Minemura et al. | |
| 7,277,247 B2 | 10/2007 | Hoshino | |
| 7,434,412 B1 | 10/2008 | Miyahira | |
| 7,474,497 B2 | 1/2009 | Jesionowski et al. | |
| 7,635,246 B2 | 12/2009 | Neeper et al. | |
| 7,656,602 B2 | 2/2010 | Iben et al. | |
| 7,656,660 B2 | 2/2010 | Hoeft et al. | |
| 7,746,634 B2 | 6/2010 | Hom et al. | |
| 7,751,188 B1 | 7/2010 | French et al. | |
| 7,961,419 B2 | 6/2011 | Suzuki et al. | |
| 8,051,671 B2 | 11/2011 | Vinson et al. | |
| 8,141,621 B2 | 3/2012 | Campbell et al. | |
| 8,151,046 B2 | 4/2012 | Suzuki et al. | |
| 8,154,870 B1 | 4/2012 | Czamara et al. | |
| 8,206,976 B2 | 6/2012 | Kobayashi et al. | |
| 8,209,993 B2 | 7/2012 | Carlson et al. | |
| 8,210,914 B2 | 7/2012 | McMahan et al. | |
| 8,456,840 B1 | 6/2013 | Clidaras et al. | |
| 8,514,513 B2 | 8/2013 | Hori | |
| 8,544,289 B2 | 10/2013 | Johnson et al. | |
| 8,675,303 B2 | 3/2014 | Compton et al. | |
| 8,694,152 B2 | 4/2014 | Cyrulik et al. | |
| 8,789,384 B2 | 7/2014 | Eckberg et al. | |
| 8,849,784 B2 | 9/2014 | Alber et al. | |
| 8,857,208 B2 | 10/2014 | Malin | |
| 8,939,524 B2 * | 1/2015 | Gasser | F24F 1/027 |
| | | | 312/236 |
| 8,974,274 B2 | 3/2015 | Carlson | |
| 9,025,275 B1 | 5/2015 | Manes et al. | |
| 9,043,035 B2 | 5/2015 | Chainer et al. | |
| 9,069,534 B2 | 6/2015 | Rogers | |
| 9,110,641 B2 | 8/2015 | Wu | |
| 9,155,230 B2 | 10/2015 | Eriksen et al. | |
| 9,190,112 B1 | 11/2015 | Bayang et al. | |
| 9,240,209 B1 | 1/2016 | Crawford et al. | |
| 9,255,936 B2 | 2/2016 | Hunt et al. | |
| 9,291,408 B2 | 3/2016 | Iyengar et al. | |
| 9,321,136 B2 | 4/2016 | Eckberg et al. | |
| 9,361,921 B2 | 6/2016 | Herget | |
| 9,368,148 B2 | 6/2016 | Starr et al. | |
| 9,433,122 B2 | 8/2016 | Ohba et al. | |
| 9,642,286 B1 | 5/2017 | Gutierrez et al. | |
| 9,888,615 B1 | 2/2018 | Frink et al. | |
| 9,916,869 B1 | 3/2018 | Gavillan et al. | |
| 9,916,871 B1 | 3/2018 | Gavillan et al. | |
| 9,940,976 B1 | 4/2018 | Gale et al. | |
| 9,949,410 B1 | 4/2018 | Kowalski et al. | |
| 10,004,165 B1 | 6/2018 | Bailey et al. | |
| 10,026,445 B1 | 7/2018 | Gale et al. | |
| 10,026,455 B1 | 7/2018 | Gavillan et al. | |
| 10,045,457 B1 | 8/2018 | Gavillan et al. | |
| 10,276,214 B2 | 4/2019 | Gavillan et al. | |
| 10,303,376 B2 | 5/2019 | Gavillan et al. | |
| 10,395,695 B2 | 8/2019 | Gavillan et al. | |
| 10,417,851 B2 | 9/2019 | Gale et al. | |
| 10,418,063 B2 | 9/2019 | Gale et al. | |
| 10,418,071 B2 | 9/2019 | Gale et al. | |
| 10,431,254 B2 | 10/2019 | Gavillan et al. | |
| 10,490,004 B2 | 11/2019 | Gale et al. | |
| 10,679,666 B2 | 6/2020 | Gale et al. | |
| 2002/0023444 A1 | 2/2002 | Felder et al. | |
| 2002/0098064 A1 | 7/2002 | Ostwald et al. | |
| 2003/0039056 A1 | 2/2003 | Satoh | |
| 2003/0197619 A1 | 10/2003 | Lawrence et al. | |
| 2004/0025515 A1 | 2/2004 | Evans | |
| 2004/0080244 A1 | 4/2004 | Lowther, Jr. et al. | |
| 2004/0145468 A1 | 7/2004 | La et al. | |
| 2004/0153386 A1 | 8/2004 | Eckerdt | |
| 2004/0165358 A1 | 8/2004 | Regimbal et al. | |
| 2004/0264042 A1 | 12/2004 | Pollard et al. | |
| 2005/0057847 A1 | 3/2005 | Armagost et al. | |
| 2005/0170770 A1 * | 8/2005 | Johnson | H05K 7/20736 |
| | | | 454/184 |
| 2005/0185323 A1 | 8/2005 | Brace et al. | |
| 2005/0270727 A1 | 12/2005 | Shih | |
| 2006/0177922 A1 | 8/2006 | Shamah et al. | |
| 2006/0250578 A1 | 11/2006 | Pohl et al. | |
| 2006/0259195 A1 | 11/2006 | Eliuk et al. | |
| 2006/0262447 A1 | 11/2006 | Hoshino | |
| 2007/0180278 A1 | 8/2007 | Botchek | |
| 2007/0250410 A1 | 10/2007 | Brignone et al. | |
| 2008/0043371 A1 | 2/2008 | Konshak | |
| 2008/0061138 A1 | 3/2008 | Fisher et al. | |
| 2008/0065903 A1 | 3/2008 | Goodman et al. | |
| 2008/0094797 A1 * | 4/2008 | Coglitore | H05K 7/20745 |
| | | | 361/679.5 |
| 2008/0106368 A1 | 5/2008 | Vitier | |
| 2008/0151491 A1 | 6/2008 | Baldwin et al. | |
| 2008/0231152 A1 | 9/2008 | Malin | |
| 2009/0046427 A1 | 2/2009 | Noteboom et al. | |
| 2009/0061758 A1 * | 3/2009 | Yeung | F24F 7/065 |
| | | | 454/329 |
| 2009/0168345 A1 | 7/2009 | Martini | |
| 2009/0266511 A1 | 10/2009 | Yang | |
| 2010/0078492 A1 * | 4/2010 | Cislo | F24F 7/06 |
| | | | 236/49.3 |
| 2010/0170277 A1 * | 7/2010 | Schmitt | H05K 7/1497 |
| | | | 62/259.2 |
| 2010/0188810 A1 | 7/2010 | Andersen et al. | |
| 2010/0249987 A1 | 9/2010 | Hong et al. | |
| 2010/0254241 A1 | 10/2010 | Aoki | |
| 2010/0311317 A1 | 12/2010 | McReynolds et al. | |
| 2011/0022771 A1 | 1/2011 | Foerster | |
| 2011/0083824 A1 | 4/2011 | Rogers | |
| 2011/0108207 A1 | 5/2011 | Mainers et al. | |
| 2011/0231007 A1 | 9/2011 | Biehle et al. | |
| 2012/0046792 A1 | 2/2012 | Secor | |
| 2012/0155027 A1 | 6/2012 | Broome et al. | |
| 2012/0305042 A1 * | 12/2012 | Lorbiecki | E04H 3/08 |
| | | | 135/96 |
| 2013/0031928 A1 | 2/2013 | Kim | |
| 2013/0088833 A1 | 4/2013 | Cox et al. | |
| 2013/0128455 A1 | 5/2013 | Koblenz et al. | |
| 2013/0244563 A1 | 9/2013 | Noteboom et al. | |
| 2014/0019768 A1 | 1/2014 | Pineau et al. | |
| 2014/0059946 A1 | 3/2014 | Gardner et al. | |
| 2014/0206271 A1 | 7/2014 | Iganacio | |
| 2014/0238639 A1 | 8/2014 | Ambriz et al. | |
| 2014/0277765 A1 | 9/2014 | Karimini et al. | |
| 2014/0290162 A1 | 10/2014 | Tanimoto | |
| 2014/0293471 A1 | 10/2014 | Sakuma | |
| 2015/0036293 A1 | 2/2015 | Martini | |
| 2015/0086305 A1 | 3/2015 | Ostwald et al. | |
| 2015/0088319 A1 | 3/2015 | Dasari et al. | |
| 2015/0106654 A1 | 4/2015 | Foster et al. | |
| 2015/0167996 A1 | 6/2015 | Fadell et al. | |
| 2015/0179210 A1 | 6/2015 | Ostwald et al. | |
| 2015/0203297 A1 | 7/2015 | Manning et al. | |
| 2015/0208554 A1 | 7/2015 | Leigh et al. | |

(56) References Cited

U.S. PATENT DOCUMENTS

| | | |
|---|---|---|
| 2015/0269641 A1 | 9/2015 | Roy |
| 2015/0294525 A1 | 10/2015 | Broom et al. |
| 2016/0094898 A1 | 3/2016 | Primm et al. |
| 2016/0107312 A1 | 4/2016 | Morrill et al. |
| 2016/0109389 A1 | 4/2016 | Suzuki et al. |
| 2016/0112245 A1 | 4/2016 | Mankovskii |
| 2016/0117126 A1 | 4/2016 | DeSpiegeleer et al. |
| 2016/0223455 A1 | 8/2016 | Minegishi |
| 2016/0240061 A1 | 8/2016 | Li et al. |
| 2016/0302332 A1 | 10/2016 | Anderson et al. |
| 2017/0010015 A1 | 1/2017 | Jan |
| 2017/0064876 A1 | 3/2017 | Leckelt et al. |
| 2017/0154483 A1 | 6/2017 | Cordiner et al. |
| 2017/0275012 A1 | 9/2017 | Tretow et al. |
| 2017/0323666 A1 | 11/2017 | Jesionowski et al. |
| 2017/0347496 A1 | 11/2017 | Smith |
| 2018/0077819 A1 | 3/2018 | Roy |
| 2018/0155975 A1 | 6/2018 | Kempfle |
| 2018/0172304 A1 | 6/2018 | Wolfson |
| 2018/0184548 A1 | 6/2018 | Frink et al. |
| 2018/0267581 A1 | 9/2018 | Gavillan et al. |
| 2018/0267718 A1 | 9/2018 | Gale et al. |
| 2018/0268860 A1 | 9/2018 | Gavillan et al. |
| 2018/0268861 A1 | 9/2018 | Gavillan |
| 2018/0268873 A1 | 9/2018 | Gavillan |

FOREIGN PATENT DOCUMENTS

| | | |
|---|---|---|
| CN | 102881313 A | 1/2013 |
| CN | 204361533 U | 5/2015 |
| JP | 11-287499 A | 10/1999 |
| JP | 2001-93121 A | 4/2001 |
| JP | 2001-307474 A | 11/2001 |
| JP | 2009-87518 A | 4/2009 |
| JP | 2011-191207 A | 9/2011 |
| WO | 2007/099542 A2 | 9/2007 |
| WO | 2008/14578 A1 | 2/2008 |
| WO | 2009/134610 A2 | 11/2009 |
| WO | 2010/067443 A1 | 6/2010 |

OTHER PUBLICATIONS

Office Action dated Feb. 14, 2020 received in U.S. Appl. No. 15/460,429, 8 pages total.

Frachtenberg E. et al., "Thermal Design in the Open Compute Datacenter", Thermal and Thermomechanical Phenomena in Electronic Systems (ITherm), 13th IEEE I22012 (May 30-Jun. 1, 2012).

Hanaoka Y. et al., "Technologies for Realizing New ETERNUS LT270 High-End Tape Library System", FUJITSU Sci. Tech. J. 42(1):24-31 (Jan. 2006).

Lee S. et al., "Thermoelectric-Based Sustainable Self-Cooling for Fine-Grained Processor Hot Spots", 15th IEEE ITHERM Conference pp. 847-856 (May 31-Jun. 3, 2016).

McCormick-Goodhart M.H. et al., "The Design and Operation of a Passive Humidity-Controlled Cold Storage Vault Using Conventional Freezer Technology and Moisture-Sealed Cabinets", IS&T's 2004 Archiving Conference, San Antonio, Texas (Apr. 20-23, 2005).

Oga S. et al., "Indirect External Air Cooling Type Energy-Saving Hybrid Air Conditioner for Data Centers, F-COOL NEO", Fuji Electric Review 60(1):59-64 (Mar. 30, 2014).

Ouchi M. et al., "Thermal Management Systems for Data Centers With Liquid Cooling Technique of CPU",13th IEEE ITHERM Intersociety Conference pp. 790-798 (May 30-Jun. 1, 2012).

Rasmussen N., "Cooling Options for Rack Equipment With Side-to-Side Airflow", www.apc.com (2004).

Disclosed Anonymously, ip.com, "Method for a Direct Air Free Cooling With a Real Time Hygrometry Regulation for Data Center", IPCOM000200312D, pp. 1-3 (Oct. 5, 2010).

Authors: IBM, "Energy Efficient Cooling System for Data Center", IPCOM000182040D, pp. 1-4 (Apr. 23, 2009).

List of IBM Patents or Patent Applications Treated as Related dated Nov. 27, 2019.

Office Action dated Jan. 29, 2021 received in U.S. Appl. No. 16/557,099.

List of IBM Patents or Patent Applications Treated as Related Dated Mar. 1, 2021, 3 Pages.

Office Action dated Jul. 6, 2021 received in U.S. Appl. No. 16/597,469.

Office Action dated Jul. 16, 2021 received in U.S. Appl. No. 16/715,516.

\* cited by examiner

SYSTEM FOR PROVIDING AN ACCLIMATION ENCLOSURE FOR A DATA STORAGE LIBRARY

CROSS-REFERENCE TO RELATED APPLICATIONS

This patent document is a continuation of, and claims priority to, U.S. patent application Ser. No. 15/460,441, filed Mar. 16, 2017. The disclosure of the priority application is fully incorporated by reference.

BACKGROUND

The present invention relates to a data storage library for the storage and data transfer of data storage media, and more specifically, to a data storage library having one or more library frames having one or more enclosures surrounding at least an access opening of the one or more library frames.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media". Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In "deep slot" libraries, two or more cartridges may be stored in a multi-cartridge deep slot cell, arrayed in series, one behind the other, in tiers ranging from a front-most tier to a rearmost tier.

SUMMARY

In accordance with an aspect of the disclosure, an enclosure configured to at least partially surround at least one library access opening that permits access to the interior of a data storage library is disclosed. The enclosure includes at least one side surface configured to surround the at least one library access opening to form a chamber and to permit access to the interior of the data storage library, and at least one enclosure access opening in the at least one of the side surface to permit access to the interior of the chamber. The enclosure is configured to selectively permit environmental conditions inside the enclosure to acclimate between environmental conditions at or near the exterior the enclosure and environmental conditions at or near the interior of the library.

In accordance with another aspect of the disclosure, a system includes a data storage library, wherein the data storage library is configured to receive one or more data storage cartridges, and further wherein the data storage library comprises at least one access opening for accessing the interior of the data storage library having an associated movable panel. The system also includes at least one environmental conditioning unit configured to control at least one environmental condition within the data storage library, and at least one enclosure configured to surround the at least one access opening of the data storage library, wherein the at least one enclosure is configured to selectively permit environmental conditions inside the enclosure to acclimate between environmental conditions at or near the exterior the enclosure and at or near the interior of the data storage library.

According to another aspect of the disclosure, a method of acclimating at least one library component for use within an automated data storage library is disclosed, the automated data storage library comprising at least one environmental conditioning unit configured to control at least one environmental condition within the data storage library. The method includes providing at least one enclosure to surround at least one library access opening and to form a chamber, and providing at least one library component for storage in the chamber. The method also includes selectively acclimating the chamber of the enclosure by providing at least one of external air from the exterior of the data storage library, conditioned air from the at least one environmental conditioning unit, conditioned air from an environmental control device, and environmentally conditioned air from within the interior of the data storage library into the chamber, accessing the chamber of the enclosure through at least one enclosure access opening, and providing the at least one library component to at least one of the interior of the data storage library via the at least one library access opening and to the exterior of the enclosure via the at least one enclosure access opening.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In an effort to control the environment within magnetic tape libraries so as to provide suitable working conditions for magnetic tape media, data storage drives, etc., air conditioning units may be incorporated into the data storage libraries themselves. While these air conditioning units effectively control the temperature and humidity within the data storage libraries, the environmental conditions of the area surrounding the data storage libraries remain largely unchanged, with conditions often being higher in both temperature and humidity. While this may allow a datacenter to operate at reduced costs, it may also result in a marked temperature differential between the interior and exterior environments of the data storage libraries. Such a temperature differential may prove problematic during service of the data storage library and/or replacement of data storage library components such as data storage cartridges, data storage drives, library controllers, power supplies, fiber channel switches, Ethernet switches, etc., as condensation may develop on replacement cartridges and other service parts during installation and/or removal from the data storage library. Condensation accumulation on such sensitive componentry may cause component failure and/or data loss.

Figure 1A:
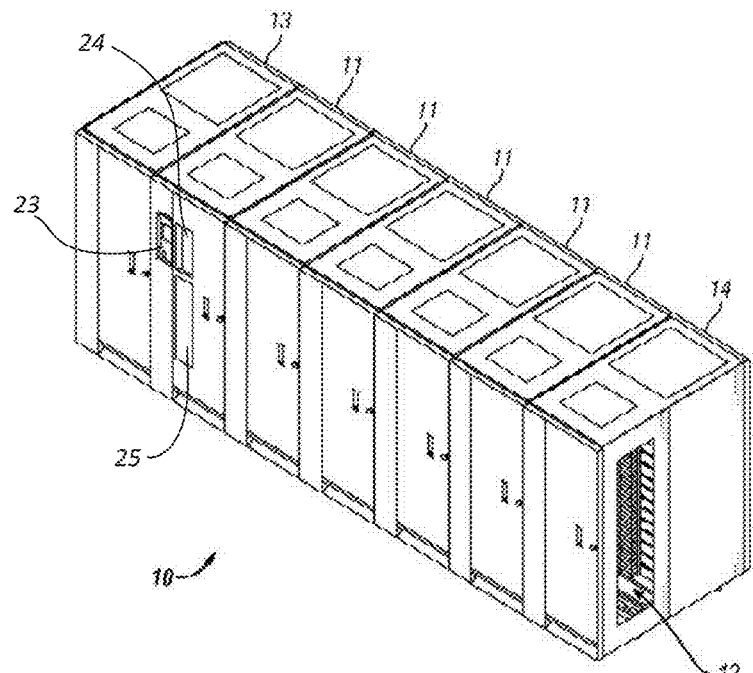
FIG. 1A is a perspective view of an automated data storage library according to one embodiment.
Figure 1B:
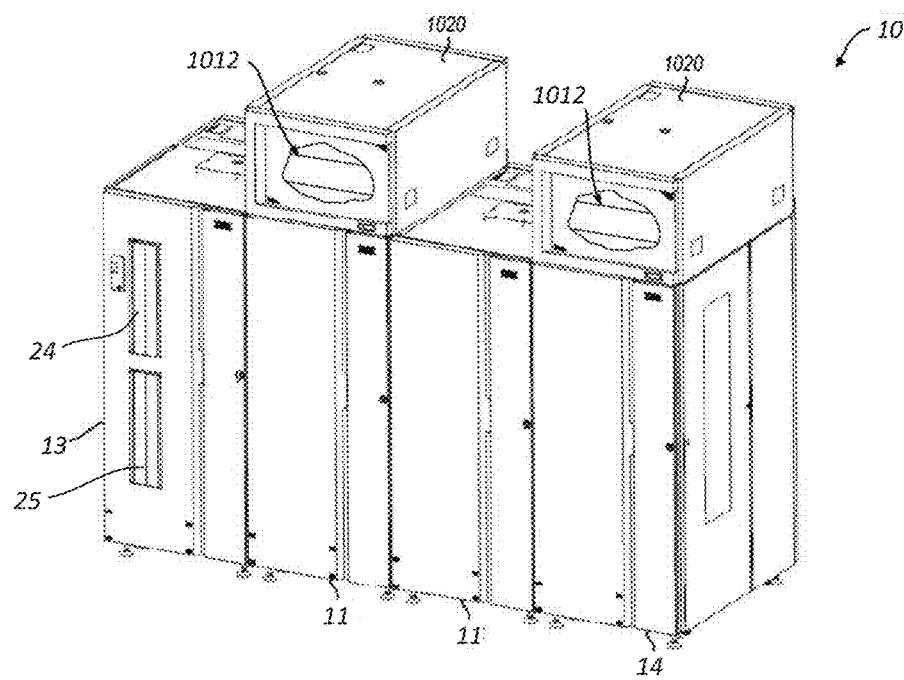
FIG. 1B is a perspective view of another embodiment of an automated data storage library.
Figure 2:
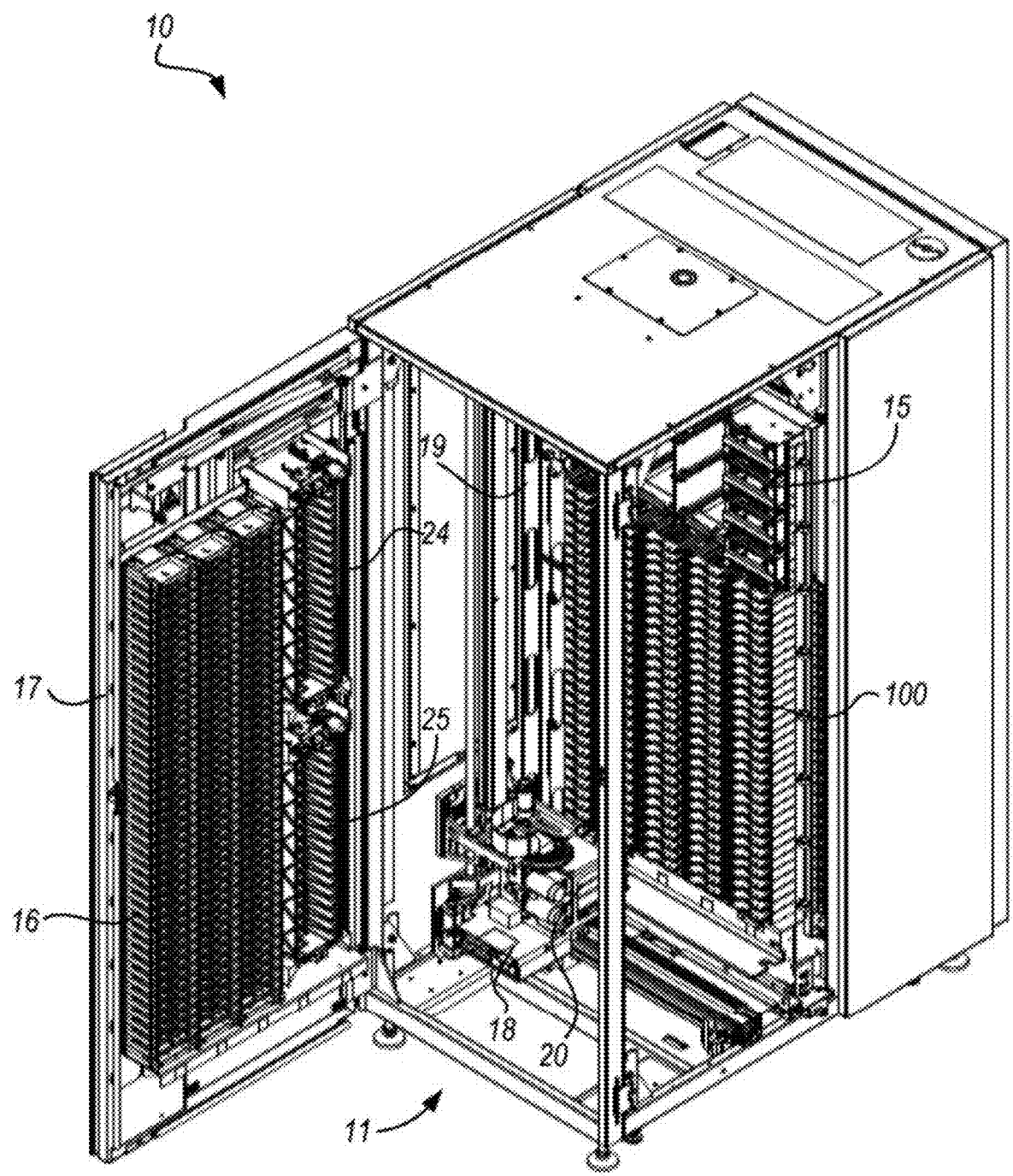
FIG. 2 is a perspective view of the interior of a storage frame from the data storage library of FIGS. 1A & 1B.

FIGS. 1A & 1B and FIG. 2 illustrate an example of a data storage system, e.g., an automated data storage library 10 which stores and retrieves data storage cartridges, containing data storage media (not shown), from multi-cartridge deep slot storage cells 100 and single cartridge storage slots 16. Examples of an automated data storage library which has a similar configuration as that depicted in FIG. 1A and FIG. 2, and may be implemented with some of the various approaches herein may include the IBM TS4500 Library or the IBM 3584 UltraScalable Tape Library.

The library 10 in the embodiment of FIG. 1A comprises a left hand service bay 13, one or more storage frames 11, and right hand service bay 14. The library 10 of FIG. 1B comprises a left handed service bay 13, one or more storage frames 11, a right handed service bay 14 and optional environmental conditioning units 1012 which may control the temperature, humidity and/or other environmental conditions in the interior of the library 10. While two environmental conditioning units are shown in FIG. 1B, it will be appreciated that more or less environmental conditioning units 1012 may be associated with the library, and in circumstances the library may have no environmental conditioning units. As will be discussed in further detail below, a frame may comprise an expansion component of the library. Thus, storage frames may be added or removed to expand or reduce the size and/or functionality of the library. According to different approaches, frames may include additional storage slots, deep storage slot cells, drives, import/export stations, accessors, operator panels, controller cards, communication cards, etc. Moreover, an accessor aisle 12 preferably extends between the storage frames and bays of the embodiments in FIGS. 1A & 1B thereby allowing an accessor to move between frames. A movable and/or deployable panel 21 may be displaced to cover and/or block (as well uncover and/or unblock) aisle 12 from communicating with the exterior of the data storage library. Panel 21 may be moved and/or removed to permit access to the interior of the service bays 13, 14. Panel 21 may be a window to permit visibility into the library 10. Herein, library frame may refer to an expansion frame or expansion module of an expandable library, or it may refer to part or all of a nonexpandable library.

FIG. 2 shows an exemplary embodiment of a storage frame 11, which may act as the base frame and/or the minimum configuration of the library 10. The storage frame 11 illustrated in FIG. 2 may have only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front door 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. The arrangement and positioning of the storage slots 16 and the deep slot cells 100 may be different than illustrated in FIG. 2.

With continued reference to FIG. 2, the storage frame 11 of the library 10 also includes at least one data storage drive 15, e.g., for reading and/or writing data with respect to the data storage media in the data storage cartridges. Additionally, a first accessor 18 may be used to transport data storage cartridges containing data storage media between the plurality of storage slots 16, the multi-cartridge deep slot cells 100, and/or the data storage drive(s) 15. According to various approaches, the data storage drives 15 may be optical disk drives, magnetic tape drives, or other types of data storage drives that are used to read and/or write data with respect to the data storage media.

As illustrated, the storage frame 11 may optionally include an operator panel or other user interface, such as a web-based interface, which allows a user to interact with the library 10. Optionally, the library 10 may have an associated software application having a user interface, which also allows a user to interact with the library 10. The software application may be executable on a computing device, a remote server, a cloud or a mobile device.

Figure 3:
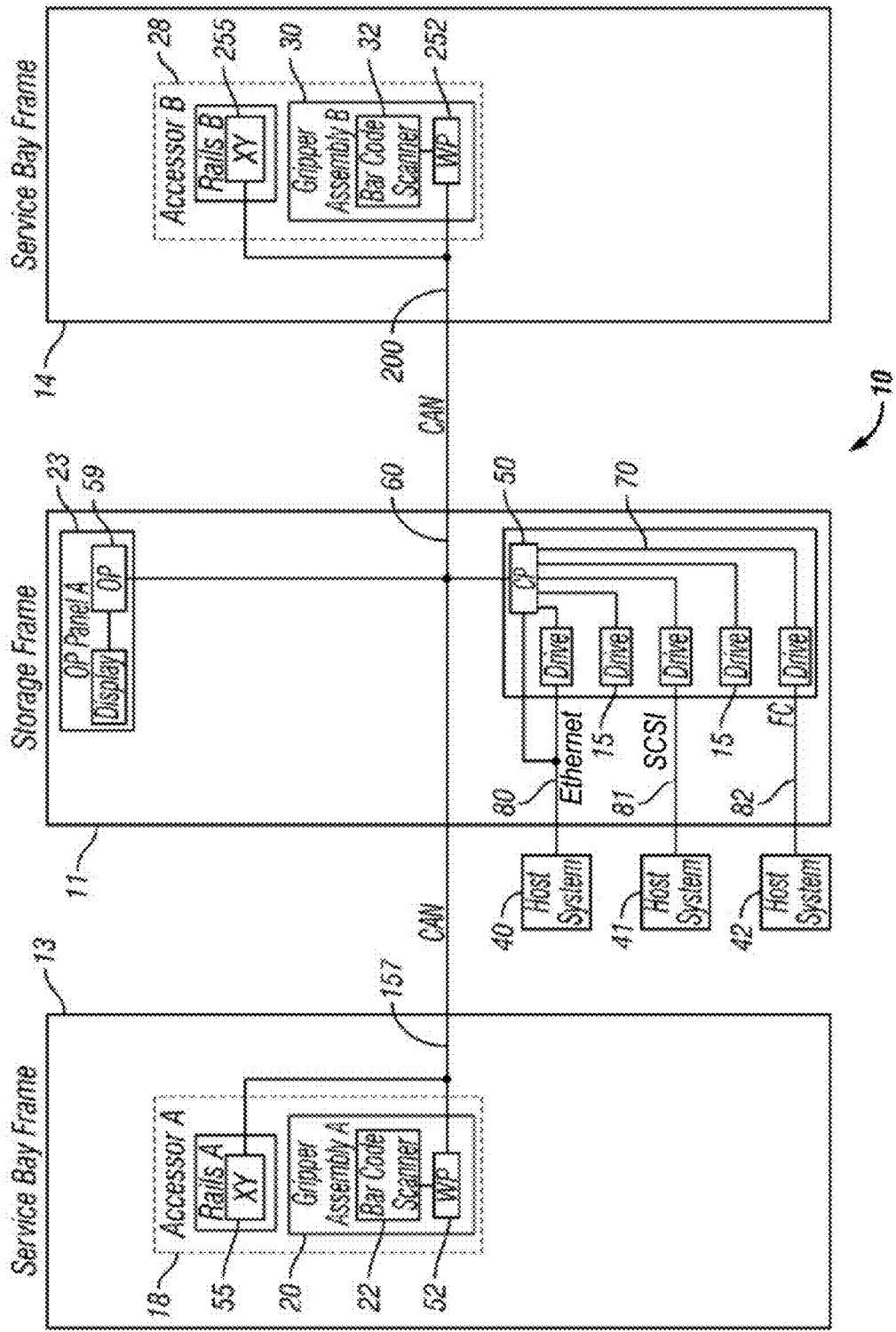
FIG. 3 is a schematic diagram of an automated data storage library according to one embodiment.

Referring now to FIG. 3, the automated data storage library 10 as described in reference to FIGS. 1A & 1B and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, and the data storage drives 15. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

As illustrated in FIG. 3, the communication processor node 50 is coupled to each of the data storage drives 15 of a storage frame 11, via lines 70, and may communicate with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, storage cells 100, data storage drives 15, networks 60, etc.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
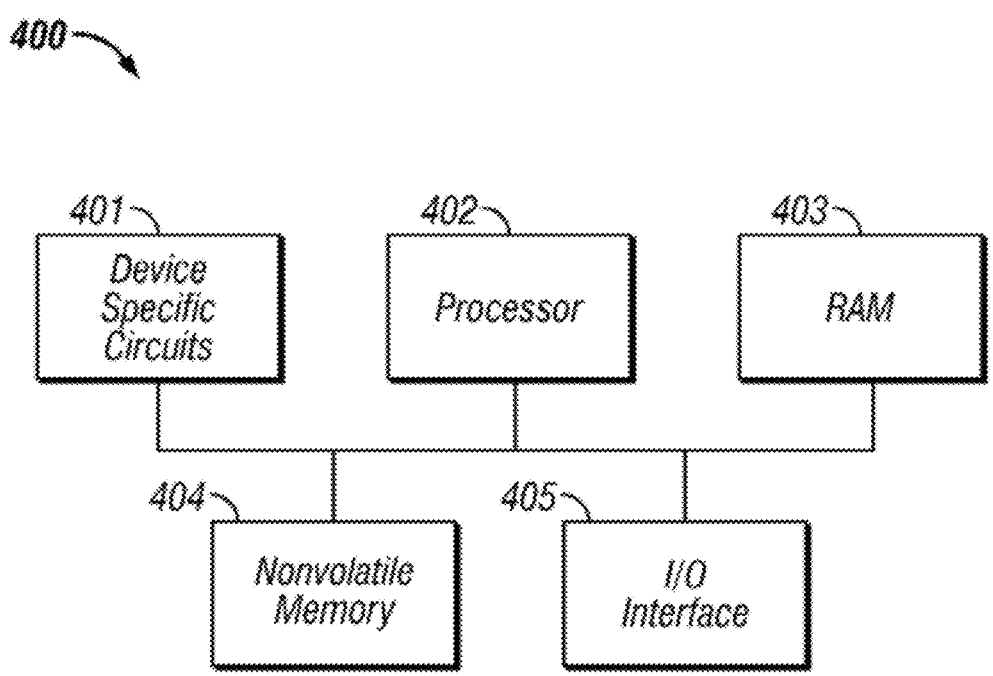
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers, or multiple cores in a processor chip.

Figure 5:
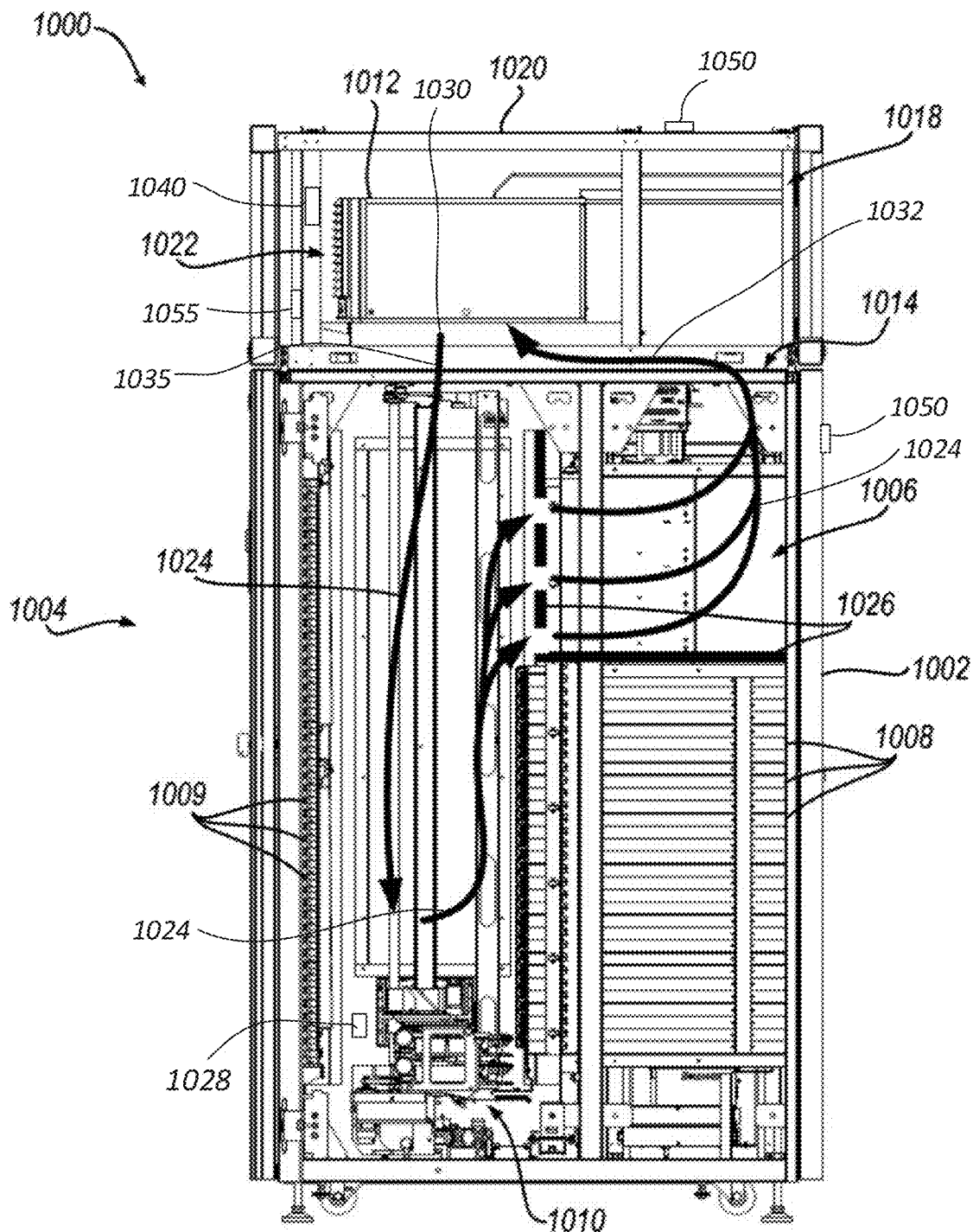
FIG. 5 is a partial side view of a system for storing magnetic recording media, in accordance with one embodiment.

Referring now to FIG. 5, a system 1000 includes a frame 1002 of an automated data storage library 1004. As described above, automated data storage libraries are typically used to store cartridges and drives in large arrays to store large amounts of data. Thus, an interior of frame 1002 is illustrated as a tape library in one embodiment, and is depicted as including one or more tape drives 1006, an area for storing tape cartridges (e.g., multi-cartridge deep slot cells 1008 and single cartridge storage slots 1009), and a robotic accessor 1010, among other components which would be apparent to one skilled in the art upon reading the present description (e.g., see FIG. 2 above).

System 1000 further includes an optional environmental conditioning unit 1012 associated with the frame 1002. The environmental conditioning unit 1012 may be integrated with and coupled to frame 1002. For the purposes of the present disclosure, it is to be understood that an environmental conditioning unit may be any device which conditions the air and/or the surrounding environment and is able to change the environmental conditions. The environmental conditions may include (but are not limited to) temperature, humidity, ionization, pressure, etc. In one embodiment, the environmental conditioning unit may be an air-conditioning unit. In other embodiments, the environmental conditioning unit may be a thermo-electric heater, a thermo-electric cooler, an electric heater, a liquid heater, a liquid cooler, a heat pump, an evaporative cooler, an ionizer, a de-ionizer, a humidifier, a dehumidifier, one or more fans, or any combination thereof. An environmental conditioning unit in accordance with one embodiment of the present disclosure may increase or decrease the temperature, humidity, pressure, etc. The environmental conditioning unit 1012 may be coupled to an upper surface 1014 (e.g., the roof) of the frame 1002 as shown in FIG. 1B and FIG. 5. The environmental conditioning unit 1012 preferably operates without negatively affecting the operating conditions in the frame 1002. Alternatively, an environmental conditioning unit may be functionally associated with the frame 1002 by positioning the environmental conditioning unit elsewhere and using ducts to route the air to the interior of the frame 1002, coupling the environmental conditioning unit to a side of the frame 1002, coupling the environmental conditioning unit to a bottom of the frame 1002 (underneath the frame 1002), etc., depending on the desired approach.

The environmental conditioning unit 1012 is preferably configured such that it may adjust, change and/or regulate the relative conditions (e.g., temperature, humidity, contaminant presence via filtering, etc.) inside the frame 1002. Thus, according to different approaches, the environmental conditioning unit may be able to reduce the temperature of the interior of the frame 1002 and/or reduce the relative humidity of the interior of the frame 1002, depending on the type of environmental conditioning unit 1012 employed. The environmental conditioning unit 1012 is preferably configured to turn on and off as desired to maintain a selected environment (e.g., temperature and/or humidity) in the interior of the frame 1002. Alternatively, the environmental conditioning unit may have a fan and the fan can be left always on to keep air circulating within the interior of the frame. In one embodiment, the environmental conditioning unit may be an air conditioning unit and the fan may be continuously on and the compressor may turn on and off to maintain a selected temperature and/or humidity in the interior of the frame 1002.

As would be appreciated by one skilled in the art, the environmental conditioning unit 1012 may be an air conditioning unit and may be able to adjust the relative temperature and/or humidity of the interior of the frame 1002 in a conventional manner. Cold air may flow into the interior of the frame 1002 via an inlet air duct 1030 which may connect the environmental conditioning unit 1012 to the interior of the frame 1002, and form an inlet 1035 in the upper surface 1014 of the frame 1002. Specifically, an inlet air duct 1030 may direct the air cooled by the environmental conditioning unit 1012 into the interior of the frame 1002, e.g., where the majority of the data storage media may be stored. As a result, air flow is created from the environmental conditioning unit 1012 to the interior of the frame 1002, as indicated by arrows 1024. This air flow may be induced by a fan included in the environmental conditioning unit 1012 and/or by using the fans in the one or more tape drives 1006 in the frame 1002. Although the air flow is preferably directed from the environmental conditioning unit 1012 to the interior of the frame 1002, and from the interior of the frame 1002 back to the environmental conditioning unit 1012, the particular path that the air flow is shown as extending along in the present embodiment by arrows 1024 is in no way intended to limit the disclosure or the invention. For example, rather than recirculating air from within automated data storage library 1004, air may be drawn in from outside automated data storage library 1004, cooled by the environmental conditioning unit 1012, and then forced out vents, cracks or openings (not shown) in automated data storage library 1004. This would have the effect of creating a positive pressure within automated data storage library 1004, to help prevent unconditioned air from leaking inside the library in the event that seals are not used or a door, panel, hatch, etc. is opened for accessing the interior of automated data storage library 1004, and it would also permit a greater area of recirculation (beyond the interior of automated data storage library 1004).

With continued reference to FIG. 5, system 1000 may include an enclosure 1020 for the environmental conditioning unit 1012. An additional fan 1040 may be included in the enclosure 1020 for passing ambient air over external components of the environmental conditioning unit 1012 to further promote heating, cooling and/or conditioning of the air (e.g., to exhaust waste heat). Moreover, the enclosure 1020 may include an opening, a baffle or baffles, etc. to direct ambient air exterior to the library 1004 toward an inlet 1022 of the environmental conditioning unit 1012.

In one embodiment, any vents, voids, seams, etc. in the frame 1002 of the library 1004, other than inlet 1035 and an outlet 1032 in an upper surface 1014 of the frame 1002, are preferably sealed such that air from outside the frame 1002 is restricted from entering the interior thereof. The frame 1002 may be sealed using any processes which would be apparent to one skilled in the art upon reading the present description, e.g., including but not limited to inserting foam, implementing insulating seals, etc. New frames may be built without any vents, voids, seams, etc. The housing and panels enclosing the frame 1002 may also be insulated to prevent or inhibit unconditioned air from entering the frame 1002.

The frame 1002 may also include one or more environmental sensors 1050 exterior to the library 1004 and may also include one or more sensors 1055 exterior to the library 1004 but inside the enclosure 1020 for the environmental conditioning unit 1012. In one embodiment the sensors 1055 may be located in front of inlet 1022 of the environmental conditioning unit 1012. The environmental sensors 1050, 1055 may be any sensor appropriate for determining the environmental conditions at the sensor location, such as one or more temperature sensors, one or more humidity sensors, one or more pressure sensors, etc. The one or more environmental sensors 1050, 1055 may be in communication with a library controller, such as library controller 400 shown and described with respect to FIG. 4 and/or environmental conditioning unit 1012. The one or more signals provided by the environmental sensors 1050, 1055 may be utilized to control the output and operation of the environmental conditioning unit 1012. Although the embodiment illustrated in FIG. 5 includes a single frame 1002 and a single environmental conditioning unit 1012, other embodiments may include additional frames and/or environmental conditioning units.

System 1000 illustrated in FIG. 5 may further comprise one or more environmental sensors 1028 disposed within the interior of the library 1002. The environmental sensor(s) may be any appropriate sensor for determining the environmental conditions within the frame 1002, such as one or more temperature sensors, one or more humidity sensors, one or more pressure sensors, etc. The one or more environmental sensors 1028 may be in communication with a library controller, such as controller 400 shown and described with respect to FIG. 4 and/or environmental conditioning unit 1012. As such, the signal provided by the one or more environmental sensors 1028 may be utilized to control the output and operation of the environmental conditioning unit 1012.

Although the embodiment illustrated in FIG. 5 includes a single frame 1002 and a single environmental conditioning unit 1012, other embodiments may include additional frames and/or environmental conditioning units.

While a data storage library having an associated preferably integrated) environmental conditioning unit advantageously controls the environmental conditions within the library, some challenges may exist when components within such a data storage library need to be serviced or replaced. As noted above, many data centers are now maintained at higher temperatures and higher humidity levels to reduce the costs relating to cooling the environment where the data storage library is located, e.g., the data center. For this reason, environmental conditions of the data center may be substantially different from those within a data storage library having an associated environmental conditioning unit which controls the environmental conditions within the data storage library. As such, a component (such as, for example, a data storage cartridge, tape drive, accessor, etc.) that is moved abruptly from, for example, the warm, humid environment of the data center to the cool, dry environment of the data storage library may experience thermal shock and/or develop condensation on surfaces thereof. Additionally, moving a component (such as, for example, a data storage cartridge) from the cool, less humid environment of the data storage library to the warmer, more humid data center may also develop condensation on surfaces and cause thermal shock. Moisture build-up on surfaces of sensitive components such as data storage cartridges and tape drives is undesirable, as moisture may adversely affect performance, may lead to damage, failure of the components, and/or data loss.

Thus, in accordance with aspects of the present disclosure, one or more acclimation enclosures may be associated with the data storage library so as to gradually acclimate components (e.g., data storage cartridges, replacement tape drives, accessors, power supplies, library controllers, etc.) that are placed in the acclimation enclosure for transport between the environmental conditions of the environment external to the data storage library, e.g., the data center, and that of the interior of the data storage library. The acclimation enclosure may permit components to be gradually acclimated when they are to be moved from a first environment (e.g., a hot and humid data center) into a second environment (e.g., a cool and dry data storage library), thereby resisting, impeding, inhibiting, and/or preventing undesirable environmental conditions (e.g., the formation and/or accumulation of condensation) on or within the transferred components. Similarly, the one or more acclimation enclosures may also gradually acclimate the components when they are to be moved from the second environment (e.g., a cool and dry data storage library) into the first environment (e.g., a hot and humid data center). Additionally, the one or more acclimation enclosures may operate so as to allow an operator to access the interior of the data storage library to perform service, maintenance, data storage cartridge replacement, etc., without introducing undesirable environmental conditions into the environmentally-controlled data storage library.

In one embodiment, the acclimation enclosure may rely upon osmosis to gradually acclimated the environmental conditions in the acclimation chamber to the desired parameters. The acclimation enclosure in one or more embodiments may have one or more portals and/or vents (or any other openings) in communication the exterior environment outside of the acclimation enclosure, while one or more portals and/or vents may also be disposed on the data storage library such that one or more environmental conditions within the data storage library may be communicated to the interior of the acclimation enclosure, and vice versa. A movable door, baffle, and/or barrier may be selectively displaceable relative to the vents and/or portals to facilitate gradually adjusting environmental conditions within the acclimation enclosure. In alternative embodiments, to gradually change the environment within the acclimation enclosures, the acclimation enclosures may be associated with and/or incorporate one or more environmental control devices therein, such as an electric heater, a thermoelectric heater, a thermoelectric cooler, a liquid heater, a liquid cooler, an air conditioner, a heat pump, an evaporative cooler, an ionizer, a deionizer, a humidifier, a dehumidifier, one or more fans, or any known environmental device, and combinations thereof.

Figure 6:
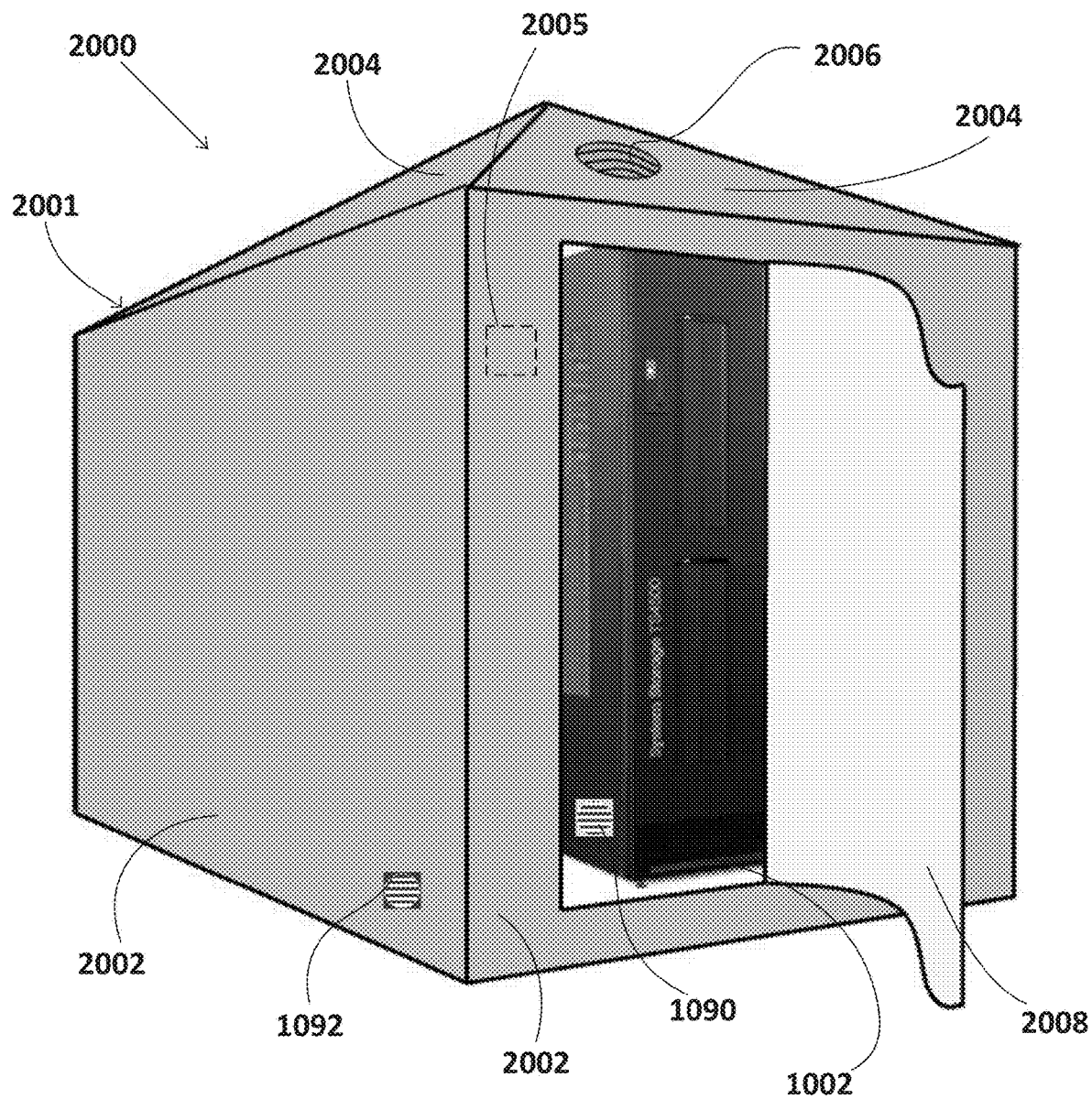
FIG. 6 is a perspective view of a data storage library and enclosure in accordance with one aspect.

Referring to FIG. 6, an acclimation enclosure system 2000 in accordance with an aspect of the present disclosure is illustrated. Acclimation enclosure system 2000 includes an acclimation enclosure 2001 substantially surrounding a data storage library frame(s) 1002, such as that described above with respect to FIG. 5. While FIG. 6 only shows library frame 1002 comprising a single library frame, it is to be understood that library frame 1002 may comprise a plurality of frames, such as that which is illustrated in FIGS. 1A-1B. Library frame(s) 1002 may comprise conventional data storage library componentry, similar to that which is found in library 10 described above with respect to FIG. 2. For instance, one or more of library frames 1002 may comprise a plurality of storage slots to hold data storage cartridges associated with data storage media, one or more data storage drives, and one or more robotic accessors. Furthermore, while not shown in FIG. 6, data storage library frame(s) 1002 may be equipped with one or more environmental conditioning units, such as that which is described above with respect to data storage library 1004 in FIGS. 1B and 5. The environmental conditioning unit(s) may control one or more environmental conditions (e.g., temperature and/or humidity) within the library frame(s) 1002. In one embodiment, it is contemplated that the data storage library will be a tape library which may include tape cartridges, tape drives, and accessors.

Acclimation enclosure 2001 may comprise a plurality of side wall panels 2002, along with at least one top panel 2004 disposed over the top surface of data storage library 1002 (and any associated environmental conditioning unit(s), such as environmental conditioning unit 1012 shown within enclosure 1020 in FIGS. 1B and 5). Acclimation enclosure 2001 may have a tent-like structure, with the capability of being easily and quickly installed (and/or uninstalled) to substantially surround a data storage library 1002. The side wall panels 2002 may be self-supporting, or may be held by a collapsible and/or removable framework structure (not shown). The framework structure may be formed of any appropriate material, such as, for example, a plurality of fiberglass, carbon fiber, aluminum, or para-aramid synthetic fiber (e.g., KEVLAR®) poles, brackets, extensions, etc. The framework structure may be broken down so as to enable the acclimation enclosure 2001 to be portable and storable when not in use. Additionally, the framework structure may comprise a plurality of spring-biased joints, enabling the structure to automatically erect when opened. While shown surrounding library frame(s) 1002 in FIG. 6, it is to be understood that acclimation enclosure 2001 may be erected or positioned alone and may not require the presence of one or more library frames 1002 in order to maintain its shape and form.

Acclimation enclosure 2001 may be formed of any suitable material, such as nylon, polyester, canvas, cotton, silk, plastic, foil, para-aramid synthetic fiber (e.g., KEVLAR®), or any other flexible material capable of providing a substantially protected enclosure so as to maintain stable environmental conditions within the enclosure 2001. Additionally and/or alternatively, acclimation enclosure 2001 may comprise multiple layers of multiple materials, either alike or different, so as to provide varying degrees of insulating properties, if needed. Furthermore, at least a portion of acclimation enclosure 2001 may be formed of a substantially water-resistant or waterproof material.

At least one closable access door 2008 may be provided on at least one of side wall panel(s) 2002 so as to allow selective access by an operator into the interior of enclosure 2001. Access door 2008 may be made of any suitable material or combination of materials, be they the same or different materials than enclosure 2001, such as nylon, polyester, canvas, cotton, silk, plastic, foil, para-aramid synthetic fiber (e.g., KEVLAR®), or any other flexible material. Furthermore, access door 2008 may be configured as a hinged door (e.g., an office door, cabinet door, etc.), hinged flap (e.g., a non-zippered door to a camping tent), a zippered door (e.g., a zippered camping tent door), one or more vertically-hanging slots or flaps (e.g., a door to a high traffic cold storage room), a split membrane (e.g., a flexible slot or hole that remains closed until forced open), an air curtain (e.g., a high traffic store front that uses a wall of forced air to create an environmental barrier), a sliding panel (e.g., a sliding closet door, a pocket door, etc.), a rolled door (e.g., rolling blinds, rolled security door, etc.), or any other appropriate closure capable of allowing selective access, yet maintaining a sealed environment within enclosure 2001.

When access door 2008 is closed, acclimation enclosure 2001 may form a substantially isolated environment around library frame(s) 1002, either encompassing all of the library frame(s) 1002, or at least those portions of library frame(s) 1002 where an operator may gain access to the interior of frame(s) 1002. Ideally, acclimation enclosure 2001 is sized so as to allow one or more library components, such as one or more data storage drives, one or more data storage cartridges, one or more robot accessors, one or more power supplies, one or more library controllers, etc. to be storable therein. Accordingly, the one or more library components may be stored within acclimation enclosure 2001 prior to (and/or subsequent to) installation within library frame(s) 1002, which may aid in avoiding or preventing undesirable environmental conditions (e.g., condensation from forming and/or accumulating on or within the library component(s) or other structures) within the library frame(s) 1002 due to the movement of the component(s) from an external environment into the conditioned environment of the data storage library too quickly, or vice versa.

In the embodiment shown in FIG. 6, the acclimation enclosure 2001 may gradually ramp one or more environmental conditions within the enclosure to be the same as or similar to the environmental condition(s) within the library frame(s) 1002 and/or the external environmental conditions of the surrounding room (e.g., the data center) via osmosis. For example, acclimation enclosure 2001 may comprise at least one vent 1092 formed on at least one side thereof, with vent 1092 capable of selectively allowing ambient air from external or outside of enclosure 2001 to gradually enter the enclosure 2001. Vent 1092 may be opened and closed manually (e.g., by an operator moving a vent closure, as a result of a technician closing access door 2008, by activating a switch, lever, or button on a keyboard or graphical user interface, etc.), or may be opened and closed automatically (e.g., with motors or actuators under the control of an environmental conditioning unit, under the control of a controller, such as a dedicated enclosure controller or the library controller, etc.). While only one vent 1092 is shown in FIG. 6, it is to be understood that a plurality of vents may be utilized on any surface of enclosure 2001. Furthermore, one or more portals or doors may be utilized in addition to or in lieu of vent(s) 1092 to allow ambient air to enter enclosure 2001.

With vent 1092 opened, ambient air may gradually enter enclosure 2001, thereby acclimating the interior of enclosure 2001 to be at or near the environmental condition(s) of the surrounding room (e.g., the data center). As noted above, one or more library components may be placed within the enclosure 2001 for acclimation prior to installation within the data storage library. Next, the vent 1092 may be closed (either manually or automatically) so as restrict and/or prevent ambient air from entering enclosure 2001, and a vent 1090 located on a side wall of frame(s) 1002 may then be opened, either manually or automatically. Vent 1090 may be capable of communicating conditioned air from within frame(s) 1002 externally, thereby providing the conditioned air into the interior of enclosure 2001 so as to gradually acclimate the interior of enclosure 2001 to the environmental condition(s) within frame(s) 1002. Alternatively, and/or additionally, one or more portals or doors may be provided in frame(s) 1002 to allow conditioned air from within the frame(s) 1002 to reach the enclosure 2001. Also, while only one vent 1090 is shown in FIG. 6, it is to be understood that more than one vent (or portal, or door) may be located on the library frame(s) 1002 so as to communicate conditioned air from within the frame(s) 1002 into enclosure 2001, or conditioned air may be vented directly from the environmental conditioning unit into the enclosure 2001. In this way, component(s) stored within enclosure 2001 may be gradually acclimated to the environmental condition(s) within library frame(s) 1002 prior to installation therein. As noted above, such acclimation may aid in resisting, inhibiting, impeding, avoiding and/or preventing undesirable environmental conditions (e.g., condensation from forming and/or accumulating on the library component(s) or other structures) within the library frame(s) 1002 due to the movement of the component(s) from an external environment into the conditioned environment of the data storage library too quickly, and/or vice versa. Additionally, an environmentally-acclimated enclosure 2001 may allow for a movable panel (e.g., a door) of library frame(s) 1002 to be opened for adding or removing data storage cartridges, component installation or replacement and/or library maintenance or service without an influx of external, ambient air entering the interior of the library frame(s) 1002. This, too, may aid in preventing condensation from forming and/or accumulating on the library component(s) or other structures within the library frame(s) 1002.

Enclosure 2001 may also utilize one or more environmental condition sensors 2005 (e.g., temperature and/or humidity sensors) so as to monitor the environmental conditions within the enclosure 2001. Readings from the one or more environmental condition sensors 2005 may be provided to a library controller (such as controller 400 shown and described with respect to FIG. 4), and/or may be provided to an environmental conditioning unit (such as environmental conditioning unit 1012 shown and described with respect to FIG. 5), and/or may be provided to a display (not shown) such that the operator may visually determine the environmental conditions within the enclosure 2001. Alternatively, enclosure 2001 may comprise no environmental condition sensors, and instead may rely solely on a passage of time or operator judgement to determine when the environmental conditions are the same or similar environmental condition(s) as the interior environmental conditions of library frame(s) 1002. Library frame(s) 1002 may also comprise one or more internal environmental condition sensors (not shown), which may also be in communication with a controller, such as controller 400. Accordingly, the progress and/or completion of the acclimation process within acclimation enclosure 2001 may be determined based on a comparison between the information received by the environmental condition sensors 2005 and the environmental condition sensors within the library frame(s) 1002.

While not shown in FIG. 6, library frame(s) 1002 may comprise at least one environmental conditioning unit 1012, such as those shown in FIGS. 1B and 5. It may be desirable to provide active venting (venting that uses fans or forced air) or passive venting (no air movement devices) to the at least one environmental conditioning unit 1012, independent of the space inside enclosure 2001. For example, the at least one environmental conditioning unit 1012 may comprise an air conditioner. Air conditioners generally comprises a heat exchanger, which emits waste heat therefrom. If enclosure 2001 were to fully enclose environmental conditioning unit 1012, the waste heat emitted by environmental conditioning unit 1012 may cause the environmental conditions within enclosure 2001 to become warmer, regardless of any communication with the interior environmental conditions of the library frame(s) 1002. In another example, the at least one environmental conditioning unit 1012 may comprise a heat pump which may produce cold waste air. Air conditioners, thermoelectric coolers, heat pumps, thermoelectric heaters are a few examples of environmental conditioning units that may produce waste air and thus benefit from venting. Thus, system 2000 may further comprise one or more vents 2006 capable of venting waste air from the environmental conditioning unit(s) 1012 out of enclosure 2001. The one or more vents 2006 may include rigid or flexible ducts. Alternatively and/or additionally, enclosure 2001 may provide direct exterior access to venting provided on the environmental conditioning unit(s) 1012 through one or more openings in the at least one top panel 2004. In this way, waste air from the environmental conditioning unit(s) 1012 preferably does not affect the environmental conditions within enclosure 2001.

Furthermore, as opposed to being a permanent or semi-permanent structure, enclosure 2001 may be temporarily erected or positioned when component acclimation and/or operator access into a particular library frame or frames is needed, and may be dismantled when access is no longer needed. Alternatively, enclosure 2001 may be temporarily moved into place when operator access into a particular library frame or frames is needed, and/or may be moved away when access is no longer needed. For movement, enclosure 2001 may comprise wheels, rollers, skids, casters, sliders, etc. or may be lifted, hoisted, carried, pulled, pushed, slid, etc. As such, a single enclosure 2001 may be utilized for access and service of a group of separate libraries and/or library frame(s) 1002 at different times. While flat sides and rectangular shapes are described and shown with respect to FIG. 6, enclosure 2001 may comprise other shapes and/or sides (e.g., circular, cylindrical spherical, triangular, etc.).

Figure 7:
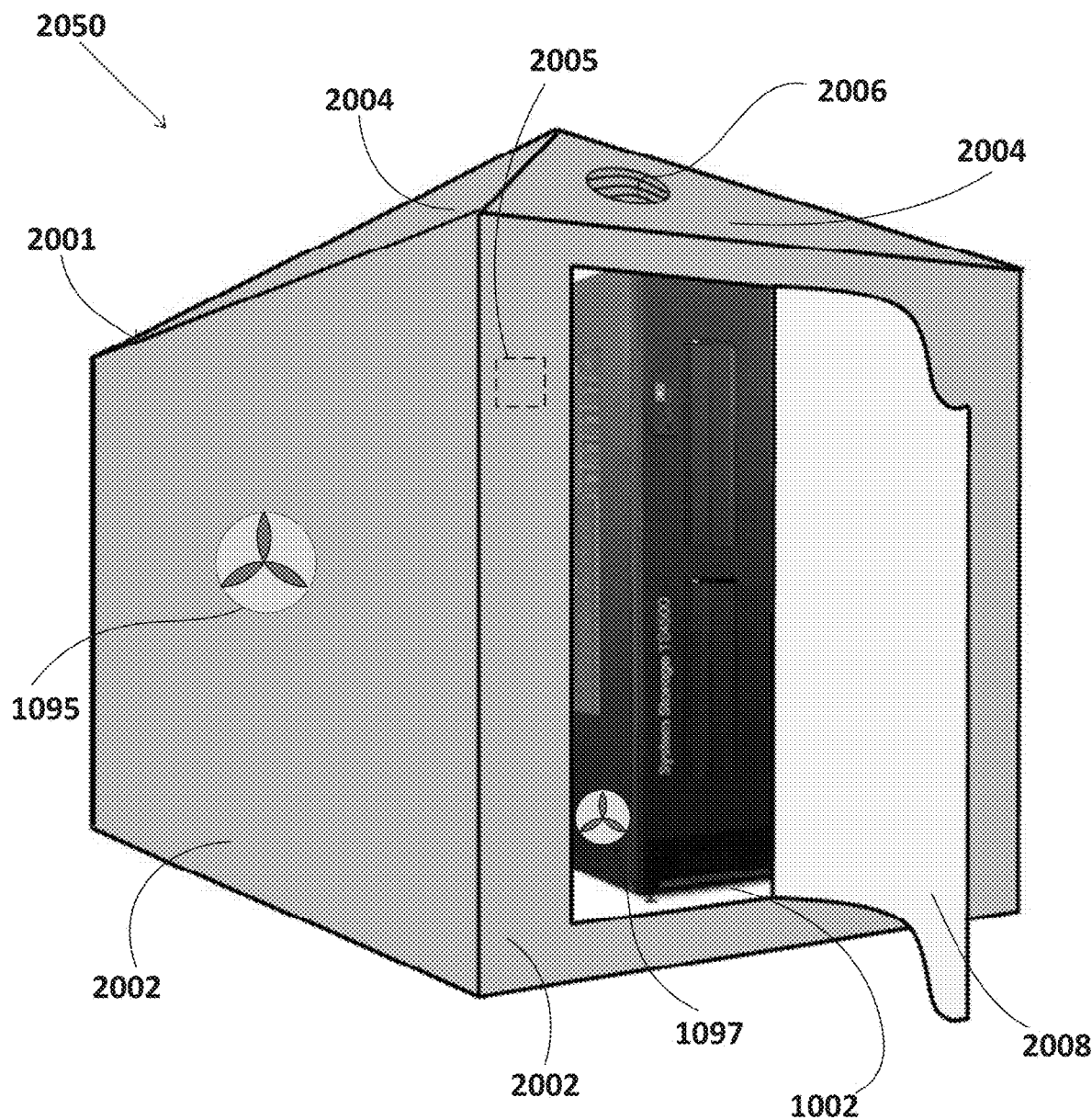
FIG. 7 is a perspective view of a data storage library and enclosure in accordance with another aspect.

Next, referring to FIG. 7, an acclimation enclosure system 2050 in accordance with another aspect of the disclosure is illustrated. In acclimation enclosure system 2050, acclimation enclosure 2001 again at least partially surrounds one or more library frame(s) 1002, as described above. However, instead of one or more passive vents being disposed on both enclosure 2001 and library frame(s) 1002, acclimation enclosure system 2050 includes an enclosure fan 1095 on enclosure 2001, as well as a library fan 1097 on library frame(s) 1002. Enclosure fan 1095 may be configured to forcefully move air from the ambient environment outside of enclosure 2001 (e.g., the data center) into enclosure 2001 so as to bring the interior of enclosure 2001 closer to the environmental conditions of the outside ambient environment (e.g., the data center). Library fan 1097, on the other hand, may force air from the conditioned environment within library frame(s) 1002 into the enclosure 2001, thereby bringing the interior of enclosure 2001 closer to the environmental conditions within the library frame(s) 1002.

Both enclosure fan 1095 and library fan 1097 may be controlled by an appropriate controller, such as library controller 400, an environmental conditioning unit, or another controller, such that the environmental conditions within enclosure 2001 are changed gradually. Alternatively, enclosure fan 1095 and library fan 1097 may be manually controlled by an operator, who may turn the respective fans 1095, 1097 on/off depending upon the environmental conditions desired with enclosure 2001. Fans 1095, 1097 may have a fixed air flow or, alternatively, they may have a variable air flow, thereby allowing for greater control of an acclimation process through the increase and/or decrease of air flow through the respective fans 1095, 1097. Additionally, while only fans 1095, 1097 are shown in FIG. 7, it is to be understood that more fans may be utilized on either or both of enclosure 2001 and library frame(s) 1002. Furthermore, only a single fan may be used for the entire acclimation enclosure system 2050, with the fan being rotatable bi-directionally such that air may be provided or removed from enclosure 2001, depending on the direction of the bi-directional fan. For example, fan 1095 may rotate in a direction that draws air from inside enclosure 2001 to the ambient environment outside enclosure 2001. This may have the effect of creating a low pressure inside enclosure 2001 thereby causing conditioned air to be drawn out from library frame(s) 1002 and into enclosure 2001 (e.g., through vents, portals or other openings in library frame(s) 1002). In addition, fan 1095 may rotate in another direction that draws air from the ambient environment outside enclosure 2001 to the inside of enclosure 2001. This may have the effect of creating a pressure inside enclosure 2001 thereby causing ambient air to be circulated through enclosure 2001 and out through vents, portals or other openings in enclosure 2001.

Utilizing enclosure fan 1095 and/or library fan 1097 as described above, component(s) stored within enclosure 2001 may be gradually acclimated to the environmental condition(s) within library frame(s) 1002 prior to installation therein. As noted above, such acclimation may aid in resisting, inhibiting, impeding, avoiding and/or preventing undesirable environmental conditions (e.g., condensation from forming and/or accumulating on the library component(s) or other structures) within the library frame(s) 1002 due to the movement of the component(s) from an external environment into the conditioned environment of the data storage library too quickly. Additionally, an environmentally-acclimated enclosure 2001 may allow for a movable panel (e.g., a door or access panel) of library frame(s) 1002 to be opened for data storage cartridge insertion or removal, component installation or replacement and/or service without an influx of external, ambient air entering the interior of the library frame(s) 1002. This, too, may aid in resisting, impeding, inhibiting, and/or preventing undesirable environmental conditions (e.g., condensation from forming and/or accumulating on the library component(s) or other structures) within the library frame(s) 1002. Herein, a movable panel may comprise a door, a magazine, an I/O station port, a service panel, a plate, a hatch, a flap, a cover, a wall, a floor, a ceiling, a panel, an air curtain or any other structure or mechanism that may cover an opening, or provide access, to the interior of the library.

As an alternative or in addition to enclosure fan 1095 and/or library fan 1097, and in accordance with another aspect of the disclosure, acclimation enclosure system 2050 may utilize one or more other environmental control devices to provide varying environmental conditions within enclosure 2001. For example, enclosure 2001 may comprise one or more electric heaters, thermoelectric heaters, thermoelectric coolers, liquid heaters, liquid coolers, refrigerated coolers, heat pumps, evaporative coolers, ionizers, deionizers, humidifiers, dehumidifiers, or any other suitable environmental control devices known to those of ordinary skill in the art, as well as any combinations thereof. By using one or more of the environmental control devices listed above, the environmental conditions within enclosure 2001 may be controlled so as to gradually acclimate any library components stored therein to the environmental conditions of the library frame(s) 1002 and/or the exterior environmental conditions.

Figure 8:
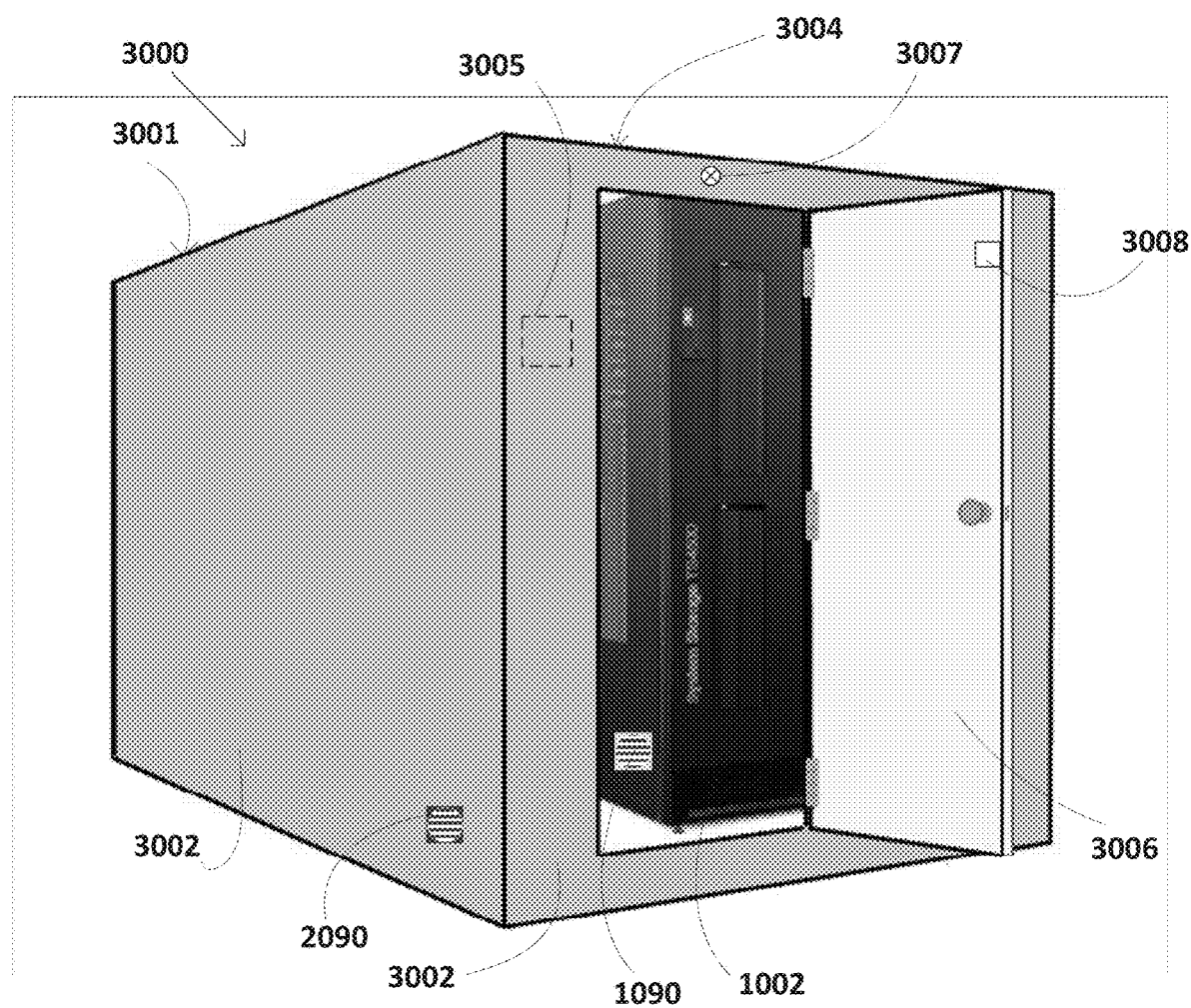
FIG. 8 is a perspective view of a data storage library and enclosure in accordance with another aspect.

Next, referring to FIG. 8, an acclimation enclosure system 3000 in accordance with another aspect of the disclosure is illustrated. Similar to acclimation enclosure systems 2000, 2050 described above, acclimation enclosure system 3000 includes an acclimation enclosure 3001 at least partially surrounding a data storage library frame(s) 1002, such as that described above with respect to FIG. 5. While FIG. 8 only shows library frame 1002 comprising a single library frame, it is to be understood that library frame 1002 may comprise a plurality of frames, such as that which is illustrated in FIGS. 1A-1B. Library frame(s) 1002 may comprise conventional data storage library componentry, similar to that which is found in library 10 described above with respect to FIG. 2. For instance, one or more of library frames 1002 may comprise a plurality of storage slots to hold data storage cartridges associated with data storage media, one or more tape drives, and one or more robotic accessors. Furthermore, while not shown in FIG. 8, data storage library 1002 may be equipped with one or more environmental conditioning units, such as that which is described above with respect to data storage library 1004 in FIG. 5. The environmental conditioning unit(s) may control one or more environmental conditions (e.g., temperature and/or humidity) within the library frame(s) 1002. In one embodiment, it is contemplated that the data storage library will be a tape library which may include tape cartridges, tape drives, and accessors.

Acclimation enclosure 3001 may be configured to substantially surround the data storage library frame(s) 1002. Enclosure 3001 may comprise a plurality of side wall panels 3002, along with at least one top panel 3004 disposed over the top surface of data storage library 1002 (and any associated environmental conditioning unit(s), such as environmental conditioning unit 1012 shown within enclosure 1020 in FIGS. 1B and 5). Accordingly, enclosure 3001 may substantially surround library frame(s) 1002 so as to form an insulated and/or isolated environment around library frame(s) 1002, separate from the environment of the surrounding room (e.g., the data center).

Enclosure 3001 may be formed of any rigid structural material such as, for example, wood, plastic, carbon fiber, metal, etc. Additionally and/or alternatively, enclosure 3001 may comprise multiple layers of multiple materials, either alike or different, so as to provide varying degrees of insulating properties, if needed. Furthermore, at least a portion of enclosure 3001 may be formed of a substantially water-resistant or waterproof material. Enclosure 3001 may be constructed around library frame(s) 1002 so as to be either a portable, permanent, or semi-permanent structure.

At least one access door 3006 may be provided on at least one of side wall panel(s) 3002 so as to allow selective access by an operator into the interior of enclosure 3001. Access door 3006 may be a hinged door constructed of the same or similar materials as the side wall panel(s) 3002, such as wood, plastic, carbon fiber, metal, etc. Alternatively, access door 3006 may be made of a different, non-rigid material, such as nylon, polyester, canvas, cotton, silk, plastic, foil, para-aramid synthetic fiber (e.g., KEVLAR®), or any other suitable flexible material. Furthermore, access door 3006 may be configured as a hinged door (e.g., an office door, cabinet door, etc.), hinged flap (e.g., a non-zippered door to a camping tent), a zippered door (e.g., a zippered camping tent door), one or more vertically-hanging slots or flaps (e.g., a door to a high traffic cold storage room), a split membrane (e.g., a flexible slot or hole that remains closed until forced open), an air curtain (e.g., a high traffic store front that uses a wall of forced air to create an environmental barrier), a sliding panel (e.g., a sliding closet door, a pocket door, etc.), a rolled door (e.g., rolling blinds, rolled security door, etc.), or any other appropriate closure capable of allowing selective access, yet preferably maintaining an insulated, separate, and/or isolated environment within enclosure 3001.

When access door 3006 is closed, enclosure 3001 may form an environmentally-isolated environment around library frame(s) 1002, either encompassing all of the library frame(s) 1002, or at least those portions of library frame(s) 1002 where an operator may gain access to the interior of frame(s) 1002. Ideally, acclimation enclosure 3001 is sized so as to allow one or more library components, such as one or more data storage drives, one or more data storage cartridges, one or more robot accessors, one or more power supplies, one or more library controllers, etc. to be storable therein. Accordingly, the one or more library components may be stored within acclimation enclosure 3001 prior to installation within library frame(s) 1002, which may aid in resisting, avoiding, and/or preventing thermal shock and/or other undesirable environmental conditions (e.g., condensation from forming and/or accumulating on the library component(s) or other structures) within the library frame(s) 1002 due to the movement of the component(s) from an external environment into the conditioned environment of the data storage library.

In the embodiment shown in FIG. 8, the acclimation enclosure 3001 may gradually ramp one or more environmental conditions within the enclosure to be the same as or similar to the environmental condition(s) within the library frame(s) 1002 and/or the external environmental conditions of the surrounding room (e.g., the data center) via osmosis. For example, acclimation enclosure 3001 may comprise at least one vent 2090 formed on at least one side thereof, with vent 2090 capable of selectively allowing ambient air from external enclosure 3001 to gradually enter the enclosure 3001. Vent 2090 may be opened and closed manually (e.g., by an operator), or may be opened and closed automatically (e.g., with motors or actuators under the control of a controller, such as a dedicated enclosure controller or the library controller). While only one vent 2090 is shown in FIG. 8, it is to be understood that a plurality of vents may be utilized on any surface of enclosure 3001. Furthermore, one or more portals or doors may be utilized in addition to or in lieu of vent(s) 2090 to allow ambient air to enter enclosure 3001.

With vent 2090 opened, ambient air may gradually enter enclosure 3001, thereby acclimating the interior of enclosure 3001 to be at or near the environmental condition(s) of the surrounding room (e.g., the data center). As noted above, one or more library components may be placed within the enclosure 3001 for acclimation prior to installation within the data storage library. Next, the vent 2090 may be closed (either manually or automatically) so as restrict, impede, and/or prevent ambient air from entering enclosure 3001, and a vent 1090 located on a side wall of frame(s) 1002 may then be opened, either manually or automatically. Vent 1090 may be capable of communicating conditioned air from within frame(s) 1002 externally, thereby providing the conditioned air into the interior of enclosure 3001 so as to gradually acclimate the interior of enclosure 3001 to the environmental condition(s) within frame(s) 1002. Alternatively and/or additionally, one or more portals or doors may be provided in frame(s) 1002 to allow conditioned air from within the frame(s) 1002 to reach the enclosure 3001. Also, while only one vent 1090 is shown in FIG. 8, it is to be understood that more than one vent (or portal, or door) may be located on the library frame(s) 1002 so as to communicate conditioned air from within the frame(s) 1002 into enclosure 2001. In this way, component(s) stored within enclosure 3001 may be gradually acclimated to the environmental condition(s) within library frame(s) 1002 prior to installation therein. Conversely, component(s) stored within enclosure 3001 may be gradually acclimated to the environmental condition(s) of the surrounding room (e.g., the data center) prior to removal from enclosure 3001. As noted above, such acclimation may aid in resisting, inhibiting, avoiding, impeding, and/or preventing thermal shock and/or other undesirable environmental conditions (e.g., condensation from forming and/or accumulating on the library component(s) or other structures) within the library frame(s) 1002 due to the movement of the component(s) from an external environment into the conditioned environment of the data storage library. Additionally, an environmentally-acclimated enclosure 3001 may allow for a movable panel (e.g., a door) of library frame(s) 1002 to be opened for component replacement and/or service without an influx of external, ambient air entering the interior of the library frame(s) 1002. This, too, may aid in preventing undesirable environmental conditions (e.g., condensation from forming and/or accumulating on the library component(s) or other structures) within the library frame(s) 1002.

While vents 1090, 2090 are illustrated in FIG. 8, it is to be understood that acclimation enclosure system 3000 may alternatively or additionally comprise one or more fans and/or one or more other environmental control devices to aid in controlling the environmental conditions within enclosure 3001, similar to those described above with respect to FIG. 7.

In addition to providing, controlling, and/or maintaining environmental acclimation around library frame(s) 1002, enclosure 3001 may further comprise one or more door switches and/or door locking mechanisms 3008 associated with the access door 3006. Door locking mechanism 3008 may be coupled to a controller (e.g., library controller 400, a controller associated with an environmental control unit, a controller associated with an environmental control device, etc.) so as to selectively lock access door 3006 when it is determined, via, e.g., one or more environmental condition sensors 3005 disposed within the enclosure 3001, that the environmental conditions therein are not suitable to allow access within the enclosure 3001 and/or the library frame(s) 1002. While not shown, the access door(s) of library frame(s) 1002 may include a similar door locking mechanism. Alternatively and/or additionally, door locking mechanism 3008 may act as (or further include) a switch which determines if and when access door 3006 is open or ajar. The controller may control the acclimation process within enclosure 3001 based upon the determination of access door 3006 being opened or closed. For example, if access door 3006 is determined to be opened, more or less conditioned air from within library frame(s) 1002 may be provided through vent 1090, depending on the conditions external to the enclosure 3001 and/or the current environmental conditions within enclosure 3001. Similarly, more or less air may be provided through vent 2090 in enclosure 3001 based upon a similar determination.

Furthermore, enclosure 3001 may additionally and/or alternatively include one or more indicators 3007 so as to allow a visual and/or an audible indication of the state of acclimation within enclosure 3001 to be observed by a technician or other personnel external to the enclosure 3001. For example, one or more indictors 3007 may be one or more of (LED) lights, one or more beepers, one or more display screens, etc. Dependent upon the on/off state of the one or more indicators 3007, a technician may be able to ascertain whether or not the enclosure 3001 is currently in an environmental acclimation cycle, whether or not the enclosure 3001 has completed an acclimation cycle, whether or not the interior of the enclosure 3001 is at or near ambient external environmental conditions, whether or not the interior of the enclosure 3001 is at or near the environmental conditions within the library frame(s) 1002, whether or not the access door 3006 can be opened, whether or not the access door 3006 is locked, etc. The one or more indicators 3007 may be coupled to, and controlled by, a controller (e.g., such as library controller 400 described above, a controller associated with an environmental control unit, a controller associated with an environmental control device, etc.). The one or more indicators 3007 may also provide different indications for one or more of the various states of acclimation, such as different colored lights, different audible signals, etc.

While not shown in FIG. 8, library frame(s) 1002 may comprise at least one environmental conditioning unit 1012, such as those shown in FIGS. 1B and 5. It may be desirable to provide active venting (venting that uses fans or forced air) or passive venting (no air movement devices) to the at least one environmental conditioning unit 1012, independent of the space inside enclosure 3001. For example, the at least one environmental conditioning unit 1012 may comprise an air conditioner. Air conditioners generally comprises a heat exchanger, which emits waste heat therefrom. If enclosure 3001 were to fully enclose environmental conditioning unit 1012, the waste heat emitted by environmental conditioning unit 1012 may cause the environmental conditions within enclosure 3001 to become warmer and/or more humid, regardless of any communication with the interior environmental conditions of the library frame(s) 1002. In another example, the at least one environmental conditioning unit 1012 may comprise a heat pump which may produce cold waste air. Air conditioners, thermoelectric coolers, heat pumps, thermoelectric heaters are a few examples of environmental conditioning units that may produce waste air and thus benefit from venting. Thus, system 3000 may further comprise one or more vents (not shown) similar to vents 2006 shown and described above with respect to FIG. 6. The one or more vents may be capable of venting waste air from the environmental conditioning unit(s) 1012 out of enclosure 3001. The one or more vents may be formed by rigid or flexible ducts. Enclosure 3001 may provide direct exterior access to venting provided on the environmental conditioning unit(s) 1012 through one or more openings in the at least one top panel 3004. In this way, waste air from the environmental conditioning unit(s) 1012 preferably does not affect or has limited effect on the environmental conditions within enclosure 3001.

Furthermore, as opposed to being a permanent or semi-permanent structure, enclosure 3001 may be temporarily erected or positioned when component acclimation and/or operator access into a particular library frame or frames is needed, and may be dismantled when access is no longer needed. Alternatively, enclosure 3001 may be temporarily moved into place when operator access into a particular library frame or frames is needed, and/or may be moved away when access is no longer needed. For movement, enclosure 3001 may comprise wheels, rollers, skids, casters, sliders, etc. or may be lifted, hoisted, carried, pulled, pushed, slid, etc. As such, a single enclosure 3001 may be utilized for access and service of a group of separate libraries and/or library frame(s) 1002 at different times.

As enclosure 3001 may be maintained at the same (or substantially the same) environmental conditions as the interior of library frame(s) 1002, an operator may access the interior of library frame(s) 1002 for maintenance, component replacement, etc., without an influx of air from within the surrounding room (e.g., the data center) from entering the library frame(s) 1002. In this way, enclosure 3001 may resist, inhibit, impede, and/or prevent undesirable environmental conditions (e.g., the formation and/or accumulation of condensation on sensitive componentry) within library frame(s) 1002. Furthermore, enclosure 3001 may be temporarily erected or positioned when operator access into a particular library frame or frames is needed, and may be dismantled when access is no longer needed. As such, a single enclosure 3001 may be utilized for access and service of a group of separate libraries and/or library frame(s) 1002 at different times. While flat sides and rectangular shapes are described and shown with respect to FIG. 8, enclosure 3001 may comprise other shapes and sides (e.g., circular, cylindrical, spherical, triangular, etc.).

Figure 9:
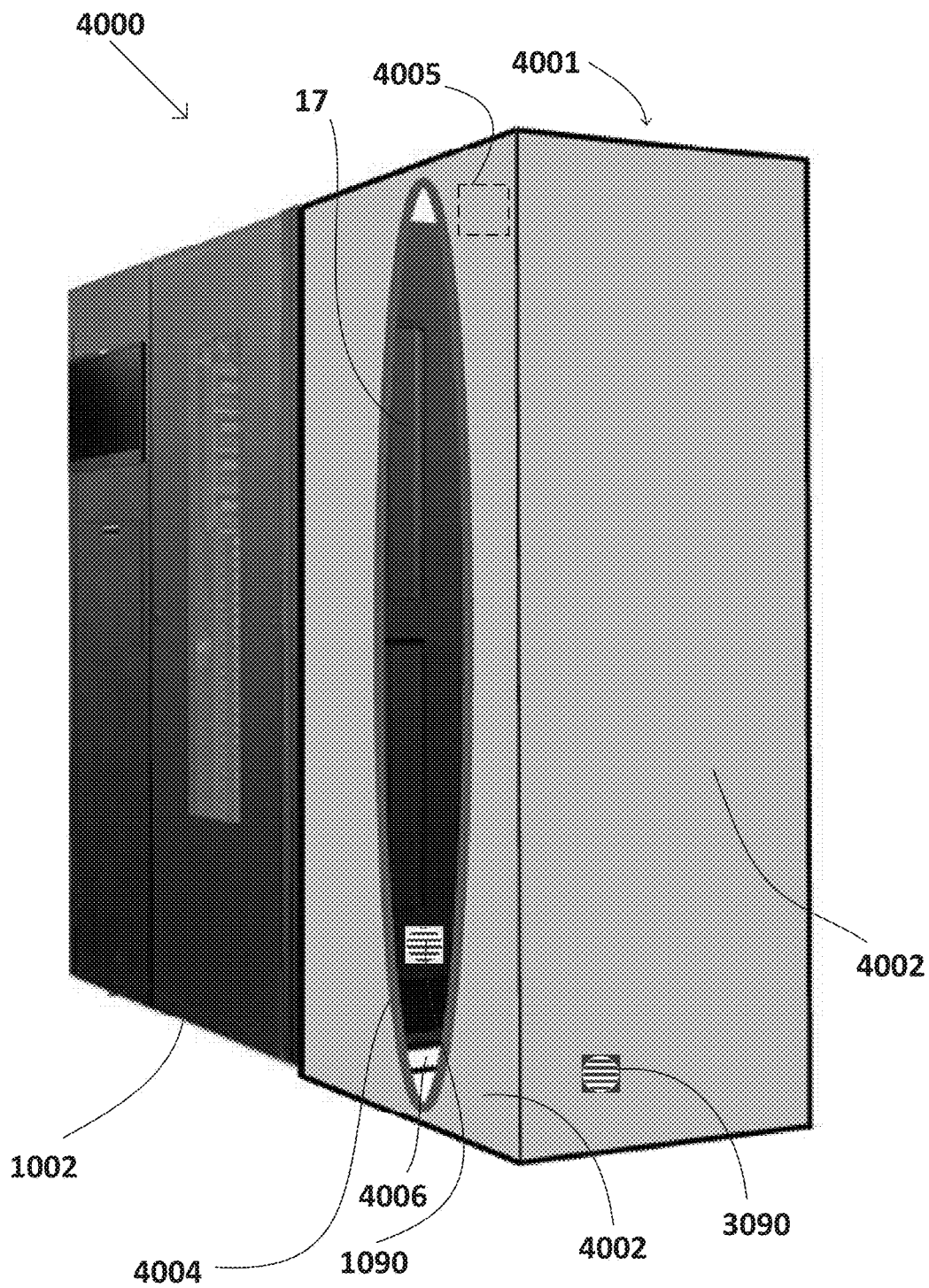
FIG. 9 is a perspective view of a data storage library and enclosure in accordance with another aspect.

Referring now to FIG. 9, another embodiment of the disclosure is illustrated. Acclimation enclosure system 4000, like acclimation enclosure systems 2000 and 3000 described above, comprises a data storage library frame(s) 1002, such as that described above with respect to FIG. 5. While FIG. 9 only shows library frame 1002 comprising a single library frame, it is to be understood that library frame 1002 may comprise a plurality of frames, such as that which is illustrated in FIGS. 1A-1B. Library frame(s) 1002 may comprise conventional data storage library componentry, similar to that which is found in library 10 described above with respect to FIG. 2. For instance, one or more of library frames 1002 may comprise a plurality of storage slots to hold data storage cartridges associated with data storage media, one or more tape drives, and one or more robotic accessors. Furthermore, while not shown in FIG. 9, data storage library 1002 may be equipped with one or more environmental conditioning units, such as that which is described above with respect to data storage library 1004 in FIG. 5. The environmental conditioning unit(s) may control one or more environmental conditions (e.g., temperature and/or humidity) within the library frame(s) 1002. In one embodiment, it is contemplated that the data storage library may be a tape library which may include tape cartridges, tape drives, and accessors.

Enclosure 4001 of system 4000 comprises at least one side panel, preferably a plurality of side panels 4002, as well as a top panel (not shown). However, unlike service access systems 2000, 3000 described above, enclosure 4001 is configured to enclose only one side (or portion thereof) and/or only the movable panel(s) of library frame(s) 1002. For example, enclosure 4001 may only enclose a side adjacent a front door 17 which provides access to the interior of library frame(s) 1002. In this way, enclosure 4001 may provide an environmentally-controlled access area to library frame(s) 1002, but without the need for venting the waste air (e.g., heat) from the environmental conditioning unit or the additional enclosure materials present in full-frame enclosures.

Enclosure 4001 further includes an access opening 4004 on at least one side thereof. Access opening 4004 is shown in FIG. 8 to be a zippered door, but may be any appropriate, substantially-closable opening. A skirt 4006 may be utilized to provide a barrier between the bottom of library frame(s) 1002 and the floor upon which the frame(s) 1002 stands. Enclosure 4001 may be formed of a flexible material, such as nylon, polyester, canvas, cotton, silk, plastic, foil, para-aramid synthetic fiber (e.g., KEVLAR®), or any other flexible material capable of providing a substantially sealable enclosure so as to maintain stable environmental conditions within the enclosure 4001. Alternatively, enclosure 4001 may be formed of a rigid structural enclosure, similar to enclosure 3001 described above. If a rigid structural enclosure is used, access opening 4004 may be formed as a hinged door (or any other type of door), similar to door 3006 described above with respect to FIG. 7.

When access opening 4004 is closed/sealed, acclimation enclosure 4001 may form a substantially insulated, separate, and/or isolated environment around at least portions of library frame(s) 1002, in particular the portions where an operator may gain access to the interior of frame(s) 1002. Ideally, acclimation enclosure 4001 is sized so as to allow one or more library components, such as one or more data storage drives, one or more data storage cartridges, one or more robot accessors, one or more power supplies, one or more library controllers, etc. to be storable therein. Accordingly, the one or more library components may be stored within acclimation enclosure 4001 prior to installation within library frame(s) 1002, which may aid in resisting, impeding, inhibiting, avoiding, and/or preventing thermal shock and/or other undesirable environmental conditions (e.g., the formation and/or accumulation of condensation on the library component(s) or other structures) within the library frame(s) 1002 due to the movement of the component(s) from an external environment into the conditioned environment of the data storage library.

In the embodiment shown in FIG. 9, the acclimation enclosure 4001 may gradually ramp one or more environmental conditions within the enclosure to be the same as or similar to the environmental condition(s) within the library frame(s) 1002 and/or the external environmental conditions of the surrounding room (e.g., the data center) via osmosis. For example, acclimation enclosure 4001 may comprise at least one vent 3090 formed on at least one side thereof, with vent 3090 capable of selectively allowing ambient air from external enclosure 4001 to gradually enter the enclosure 4001. Vent 3090 may be opened and closed manually (e.g., by an operator), or may be opened and closed automatically (e.g., with motors or actuators under the control of a controller (e.g., a dedicated enclosure controller, a library controller, an environmental control unit controller, an environmental control device controller, etc.). While only one vent 3090 is shown in FIG. 9, it is to be understood that a plurality of vents may be utilized on any surface of enclosure 4001. Furthermore, one or more portals or doors may be utilized in addition to or in lieu of vent(s) 3090 to allow ambient air to enter enclosure 4001.

With vent 3090 opened, ambient air may gradually enter enclosure 4001, thereby acclimating the interior of enclosure 4001 to be at or near the environmental condition(s) of the surrounding room (e.g., the data center). As noted above, one or more library components may be placed within the enclosure 4001 for acclimation prior to installation within the data storage library. Next, the vent 3090 may be closed (either manually or automatically) so as restrict, impede, inhibit, and/or prevent ambient air from entering enclosure 4001, and a vent 1090 located on a side wall of frame(s) 1002 may then be opened, either manually or automatically. Vent 1090 may be capable of communicating conditioned air from within frame(s) 1002 externally, thereby providing the conditioned air into the interior of enclosure 4001 so as to gradually acclimate the interior of enclosure 4001 to the environmental condition(s) within frame(s) 1002. Alternatively and/or additionally, one or more portals or doors may be provided in frame(s) 1002 to allow conditioned air from within the frame(s) 1002 to reach the enclosure 4001. Also, while only one vent 1090 is shown in FIG. 9, it is to be understood that more than one vent (or portal, or door) may be located on the library frame(s) 1002 so as to communicate conditioned air from within the frame(s) 1002 into enclosure 4001. In this way, component(s) stored within enclosure 4001 may be gradually acclimated to the environmental condition(s) within library frame(s) 1002 prior to installation therein. As noted above, such acclimation may aid in resisting, avoiding, impeding, and/or preventing thermal shock and/or other undesirable environmental conditions (e.g., condensation from forming and/or accumulating on the library component(s) or other structures) within the library frame(s) 1002 due to the movement of the component(s) from an external environment into the conditioned environment of the data storage library. Additionally, an environmentally-acclimated enclosure 4001 may allow for access door 17 of library frame(s) 1002 to be opened for component replacement and/or service without an influx of external, ambient air entering the interior of the library frame(s) 1002. This, too, may aid in resisting, inhibiting, impeding, and/or preventing undesirable environmental conditions (e.g., condensation from forming and/or accumulating on the library component(s) or other structures) within the library frame(s) 1002.

Enclosure 4001 may also utilize one or more environmental condition sensors 4005 (e.g., temperature and/or humidity sensors) so as to monitor the environmental conditions within the enclosure 4001. Readings from the one or more environmental condition sensors 4005 may be provided to a controller (e.g., a library controller, such as controller 400 shown and described with respect to FIG. 4, a dedicated enclosure controller, an environmental control unit controller, an environmental control device controller, etc. or may simply be provided to a display (not shown) such that the operator may visually or audibly determine the environmental conditions within the enclosure 4001. Alternatively, enclosure 4001 may comprise no environmental condition sensors, and instead may rely solely on a passage of time or operator judgement to determine when the environmental conditions are the same or similar environmental condition(s) as the interior environmental conditions of library frame(s) 1002. Library frame(s) 1002 may also comprise one or more internal environmental condition sensors (not shown), which may also be in communication with a controller, such as controller 400, or which may provide visual or audio indications of the environmental conditions within the library frame(s) 1002. Accordingly, the progress and/or completion of the acclimation process within acclimation enclosure 4001 may be determined based on a comparison between the information received by the environmental condition sensors 4005 and the environmental condition sensors within the library frame(s) 1002.

Due to enclosure 4001 not encompassing the entire library frame(s) 1002, waste air (e.g., heat) emitted by an environmental conditioning unit located elsewhere on library frame(s) 1002 will not affect the interior environmental conditions of enclosure 4001, and thus enclosure 4001 does not require venting in connection with environmental conditioning units associated with the data storage library. Furthermore, while not shown in FIG. 9, it is to be understood that more than one enclosure 4001 may be disposed about multiple access points on the library frame(s) 1002, thereby enabling environmentally-controlled access at multiple locations.

Furthermore, enclosure 4001 may be temporarily erected or positioned when operator access into a particular library frame or frames is needed, and may be dismantled when access is no longer needed. Alternatively, enclosure 4001 may be temporarily moved into place when operator access into a particular library frame or frames is needed, and/or may be moved away when access is no longer needed. For movement, enclosure 4001 may comprise wheels, rollers, skids, casters, sliders, etc. or may be lifted, hoisted, carried, pulled, pushed, slid, etc. As such, a single enclosure 4001 may be utilized for access and service of a group of separate libraries and/or library frame(s) 1002 at different times. While flat sides and rectangular shapes are described and shown with respect to FIG. 9, enclosure 4001 may comprise other shapes and sides (e.g., circular, cylindrical, spherical, triangular, etc.).

Figure 10:
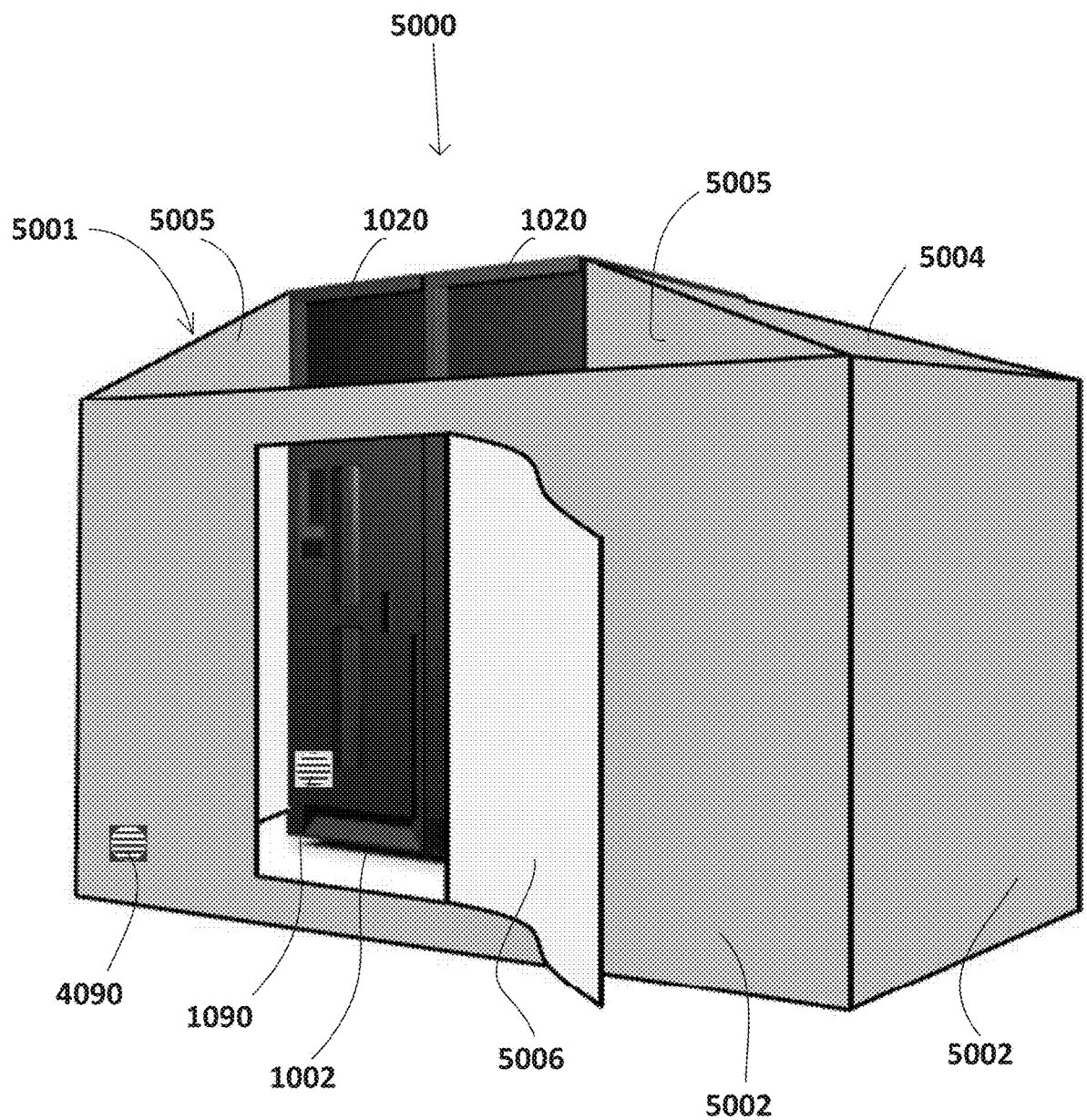
FIG. 10 is a perspective view of a data storage library and enclosure in accordance with another aspect.

Next, referring to FIG. 10, an acclimation enclosure system 5000 in accordance with another aspect of the disclosure is illustrated. System 5000 comprises an enclosure 5001 substantially surrounding the data storage library frame(s) 1002. Enclosure 5001 may comprise a plurality of side wall panels 5002, along with at least one top panel 5004 disposed over the top surface of data storage library frame(s) 1002. Additional top side panels 5005 enclose top portions of enclosure 5001, but extend only to respective environmental conditioning unit enclosures 1020 disposed on top of library frame(s) 1002. In this way, waste air generated by at least one environmental conditioning unit within environmental conditioning unit enclosures 1020 is not captured within enclosure 5001, but is instead vented directly to the outside environment (e.g., into the data center). Enclosure 5001 may have a tent-like structure, with the capability of being easily and quickly installed (and/or uninstalled) to substantially surround a data storage library frame(s) 1002. The side wall panels 5002, top panel(s) 5004, and top side panels 5005 may be self-supporting, or may be held by a collapsible and/or removable framework structure (not shown).

Enclosure 5001 may be formed of any suitable material, such as nylon, polyester, canvas, cotton, silk, plastic, foil, para-aramid synthetic fiber (e.g., KEVLAR®), or any other flexible material capable of providing a substantially sealable enclosure so as to maintain stable environmental conditions within the enclosure 5001. Additionally, and/or alternatively, enclosure 5001 may comprise multiple layers of multiple materials, either alike or different, so as to provide varying degrees of insulating properties, if needed. Furthermore, at least a portion of enclosure 5001 may be formed of a substantially water-resistant or waterproof material. At least one access door 5006 may be provided on at least one of side wall panel(s) 5002 so as to allow selective access by an operator into the interior of enclosure 5001. Access door 5006 preferably forms a barrier which resists, impedes, inhibits, and/or blocks environmental conditions exterior to the enclosure from intruding into the interior of the enclosure, and may be sealable. Access door 5006 may be made of any suitable material or combination of materials, be they the same or different materials than enclosure 5001, such as nylon, polyester, canvas, cotton, silk, plastic, foil, para-aramid synthetic fiber (e.g., KEVLAR®), or any other flexible material. Furthermore, access door 5006 may be configured as a hinged door (e.g., an office door, cabinet door, etc.), hinged flap (e.g., a non-zippered door to a camping tent), a zippered door (e.g., a zippered camping tent door), one or more vertically-hanging slots or flaps (e.g., a door to a high traffic cold storage room), a split membrane (e.g., a flexible slot or hole that remains closed until forced open), an air curtain (e.g., a high traffic store front that uses a wall of forced air to create an environmental barrier), a sliding panel (e.g., a sliding closet door, a pocket door, etc.), a rolled door (e.g., rolling blinds, rolled security door, etc.), or any other appropriate closure capable of allowing selective access, yet preferably maintaining an insulated, separate, and/or isolated environment within enclosure 5001.

System 5000 further includes one or more vents 4090 and 1090, which are each selectively operable to enable the interior of enclosure 5001 to acclimate to desired environmental conditions in a manner similar to (or the same as) that which is described above with respect to FIG. 6. Accordingly, the acclimation operation of system 5000 will not be described in detail herein. Furthermore, it is to be understood that system 5000 may incorporate one or more environmental control devices (e.g., fan(s), electric heater(s), etc.) in addition to or in lieu of vents 4090 and/or 1090 so as to control the environmental conditions within enclosure 5001. While flat sides and rectangular shapes are described and shown with respect to FIG. 10, enclosure 5001 may comprise other shapes and sides (e.g., circular, cylindrical, spherical, triangular, etc.).

Figure 11:
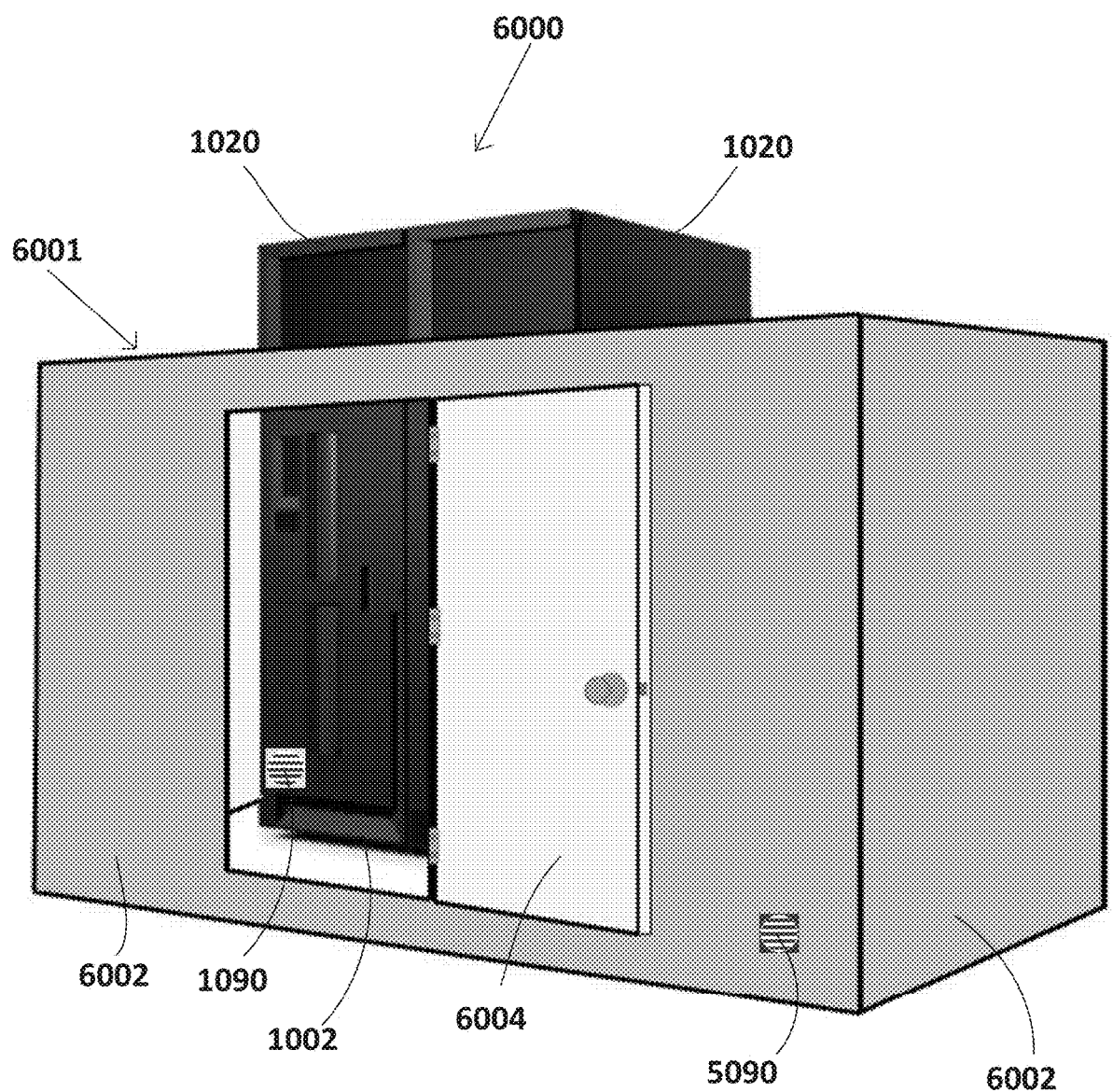
FIG. 11 is a perspective view of a data storage library and enclosure in accordance with another aspect

Referring now to FIG. 11, an acclimation enclosure system 6000 in accordance with another aspect of the disclosure is illustrated. Acclimation enclosure system 6000 comprises an enclosure 6001 substantially surrounding the data storage library frame(s) 1002. Enclosure 6001 may comprise at least one, preferably a plurality of side wall panels 6002, along with at least one top panel (not shown) disposed over the top surface of data storage library frame(s) 1002. Respective environmental conditioning unit enclosures 1020 disposed on top of library frame(s) 1002, and are not enclosed by enclosure 6001. In this way, waste air generated by the environmental conditioning units (not shown) within environmental conditioning unit enclosures 1020 is not captured within enclosure 6001, but is instead vented to the outside environment (e.g., into the data center). Accordingly, enclosure 6001 may substantially surround library frame(s) 1002 so as to form an insulated and/or insolated environment around library frame(s) 1002, separate from the environment of the surrounding room (e.g., the data center).

Enclosure 6001 may be formed of any rigid structural material such as wood, plastic, carbon fiber, metal, etc. Additionally and/or alternatively, enclosure 6001 may comprise multiple layers of multiple materials, either alike or different, so as to provide varying degrees of insulating properties, if needed. Furthermore, at least a portion of enclosure 6001 may be formed of a substantially water-resistant or waterproof material. Enclosure 6001 may be constructed around library frame(s) 1002 so as to be either a portable, permanent, or semi-permanent structure. At least one access door 6004 may be provided on at least one of side wall panel(s) 6002 so as to allow selective access by an operator into the interior of enclosure 6001. Access door 6004 may be a hinged door constructed of the same or similar materials as the side wall panel(s) 6002, such as wood, plastic, carbon fiber, metal, etc. Alternatively, access door 6004 may be made of a different, non-rigid material, such as nylon, polyester, canvas, cotton, silk, plastic, foil, para-aramid synthetic fiber (e.g., KEVLAR®), or any other suitable flexible material. Furthermore, access door 6004 may be configured as a hinged door (e.g., an office door, cabinet door, etc.), hinged flap (e.g., a non-zippered door to a camping tent), a zippered door (e.g., a zippered camping tent door), one or more vertically-hanging slots or flaps (e.g., a door to a high traffic cold storage room), a split membrane (e.g., a flexible slot or hole that remains closed until forced open), an air curtain (e.g., a high traffic store front that uses a wall of forced air to create an environmental barrier), a sliding panel (e.g., a sliding closet door, a pocket door, etc.), a rolled door (e.g., rolling blinds, rolled security door, etc.), or any other appropriate closure capable of allowing selective access, yet preferably maintaining an insulated, separate, and/or isolated environment within enclosure 6001.

Similar to acclimation enclosure system 5000 described above with respect to FIG. 10, system 6000 further includes one or more vents 5090 and 1090, which are each selectively operable to enable the interior of enclosure 6001 to acclimate to desired environmental conditions in a manner similar to (or the same as) that which is described above with respect to FIG. 8. Accordingly, the acclimation operation of system 6000 will not be described in detail herein. Furthermore, it is to be understood that system 6000 may incorporate one or more environmental control devices (e.g., fan(s), electric heater(s), etc.) in addition to or in lieu of vents 5090 and/or 1090 so as to control the environmental conditions within enclosure 6001. While flat sides and rectangular shapes are described and shown with respect to FIG. 11, enclosure 6001 may comprise other shapes and sides (e.g., circular, cylindrical, spherical, triangular, etc.).

Figure 12:
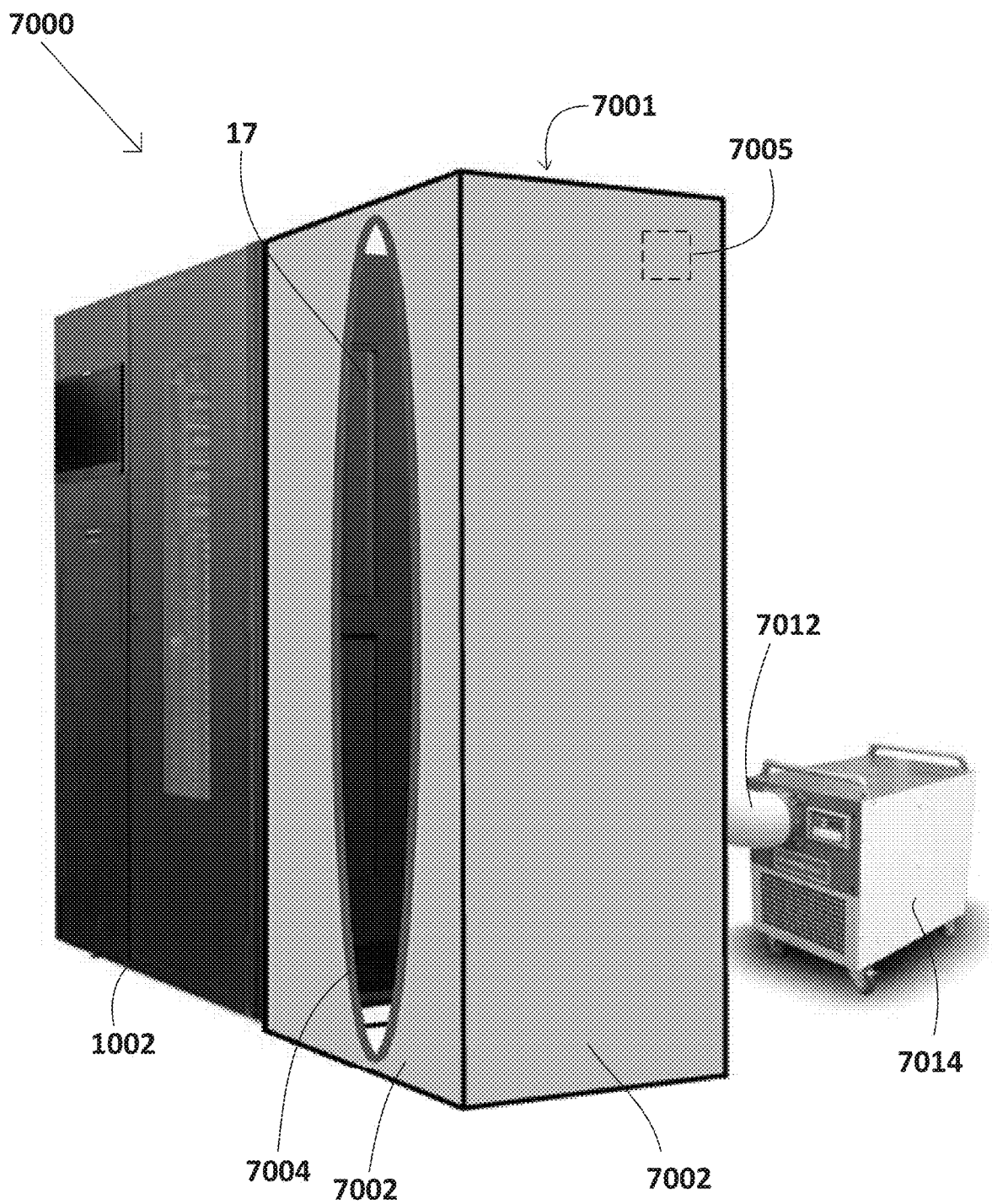
FIG. 12 is a perspective view of a data storage library and enclosure in accordance with another aspect.

Next, referring to FIG. 12, an acclimation enclosure system 7000 in accordance with another aspect is disclosed. Acclimation enclosure system 7000 comprises an enclosure 7001 having a plurality of side panels 7002, as well as a top panel (not shown). Enclosure 7001 may be configured to only enclose one side of library frame(s) 1002. For example, enclosure 7001 may only enclose a side adjacent a front door 17 which provides access to the interior of library frame(s) 1002. In this way, enclosure 7001 may provide an environmentally-controlled access area to library frame(s) 1002, but without the need for waste air venting or additional enclosure materials present in full-frame enclosures.

Enclosure 7001 further includes an access opening 7004 on at least one side thereof. Access opening 7004 is shown in FIG. 12 to be a zippered door, but may be any appropriate, opening, preferably a sealable opening. Enclosure 7001 may be formed of a flexible material, such as nylon, polyester, canvas, cotton, silk, plastic, foil, para-aramid synthetic fiber (e.g., KEVLAR®), or any other flexible material capable of providing a substantially sealable enclosure so as to maintain stable environmental conditions within the enclosure 7001. Alternatively, enclosure 7001 may be formed of a rigid structural enclosure, similar to enclosures 3001, 6001 described above. If a rigid structural enclosure is used, access opening 7004 may be formed as a hinged door (or any other type of door), similar to door 3006 described above with respect to FIG. 8.

When access opening 7004 is closed and/or sealed, enclosure 7001 may form a substantially protected environment around the front door 17 of library frame(s) 1002. However, unlike enclosure 4001 described above with respect to FIG. 10, which may be gradually acclimated to the same or similar environmental condition(s) as the interior of the library frame(s) 1002 and/or the environmental conditions external to the enclosure 4001 via one or more vents in the library frame(s) 1002 and/or the enclosure 4001, enclosure 7001 may additionally, or alternatively, be coupled to at least one enclosure environmental conditioning unit 7014. That is, at least one enclosure environmental conditioning unit(s) 7014 may be fluidly coupled to enclosure 7001 (e.g., via a duct 7012) such that the environmental conditions within enclosure 7001 may be controlled independently of the environmental conditions within library frame(s) 1002. As such, the enclosure 7001 may be acclimated to the interior environmental conditions of library frame(s) 1002 and/or the exterior environmental conditions outside of enclosure 7001 without the need for moving air from the library frame(s) 1002 to the enclosure 7001, moving air from the area outside enclosure 7001 to the enclosure 7001, and/or without the need for one or more vent(s), portal(s), etc. formed in the library frame(s) 1002 and/or enclosure 7001. Such a configuration not only avoids the need for vent(s), portal(s), etc., but also lessens the burden on the environmental conditioning unit associated with the library frame(s) 1002, which may not have been originally sized and designed to handle the increased volume caused by the addition of enclosure 7001. Alternatively, acclimation enclosure system 7000 may comprise an environmental control device rather than enclosure environmental conditioning unit 7014. An enclosure environmental conditioning unit and an environmental control device may refer to the same apparatus. In general, an enclosure environmental conditioning unit is external to the enclosure (e.g., enclosure 7001) and an environmental control device is internal to the enclosure. Enclosure 7001 may also utilize one or more environmental condition sensors 7005 (e.g., temperature and/or humidity sensors) so as to monitor the environmental conditions within the enclosure 7001. In addition, library frame(s) 1002 may also utilize one or more environmental condition sensors. Readings from the one or more environmental condition sensors may be provided to a controller (e.g., a library controller, such as controller 400 shown and described with respect to FIG. 4, a dedicated enclosure controller, a library environmental conditioning unit, an enclosure environmental conditioning unit, an environmental control device, etc.) or may simply be provided to a display or audio device (not shown) such that the operator may determine the environmental conditions within the enclosure 7001. In the case where readings from the one or more environmental condition sensors 7005 are provided to a controller, the controller may control part or all of the acclimation process and/or may control audio and/or visual indications of the progress of the acclimation process.

Alternatively, enclosure 7001 may comprise no environmental condition sensors, and instead may rely solely on a passage of time or operator judgement as to when the environmental conditions sufficiently acclimated for a service procedure, component removal, component installation, and/or the storage of library components therein.

In one aspect, when service and/or component acclimation is needed, enclosure 7001 may be installed and/or moved into place adjacent door 17 (or another access opening) of library frame(s) 1002. Enclosure environmental conditioning unit 7014 may then be fluidly coupled and operated so as to bring the environmental condition(s) within the enclosure 7001 to be at or near those within the library frame(s) 1002, thereby acclimating the components therein and/or allowing an operator to access the interior of library frame(s) 1002 without causing an influx of external air into the frame(s) 1002, or allowing an operator to access the interior of the enclosure 7001 after it has acclimated from a conditioned environment to an ambient environment. When the component replacement and/or service procedure is complete, enclosure 7001 may be deconstructed and/or moved away from the library frame(s) 1002, along with enclosure environmental conditioning unit 7014. In this way, a single enclosure 7001 and enclosure environmental conditioning unit 7014 may be portable and used only in an on-demand fashion based on service needs.

In another aspect, enclosure 7001 may be normally installed adjacent frame(s) 1002 (i.e., permanently or semi-permanently), but enclosure environmental conditioning unit 7014 may be portable and movable between various enclosures. Thus, when component acclimation and/or service is needed within library frame(s) 1002, enclosure environmental conditioning unit 7014 may be coupled to an enclosure 7001 so as to bring the environmental condition(s) within the enclosure 7001 to be at or near those within the library frame(s) 1002. When the component acclimation and/or service procedure is complete, enclosure environmental conditioning unit 7014 may be decoupled from the enclosure 7001 such that it may be used at other locations in an on-demand fashion based on service needs. While flat sides and rectangular shapes are described and shown with respect to FIG. 12, enclosure 7001 may comprise other shapes and sides (e.g., circular, cylindrical, spherical, triangular, etc.).

Figure 13:
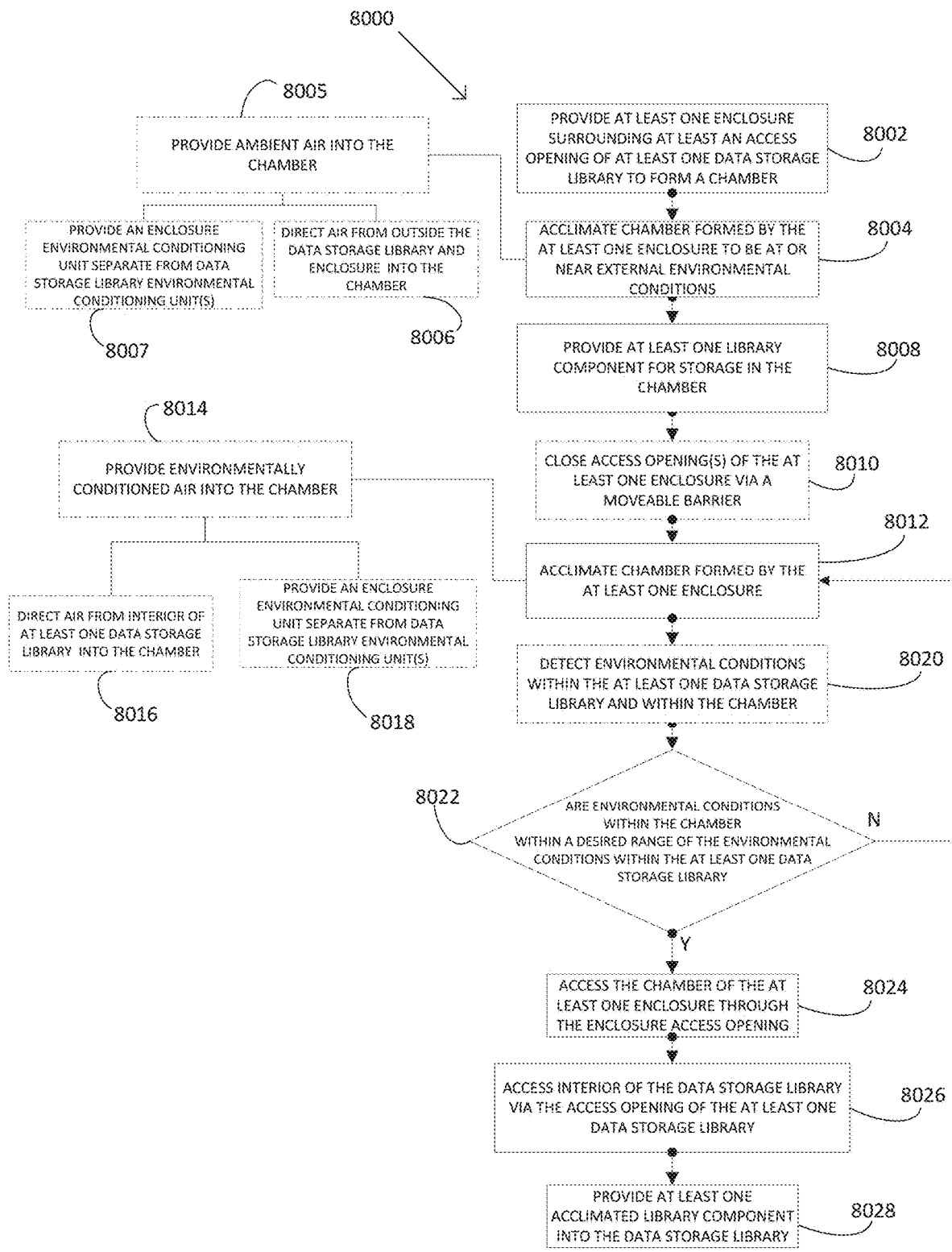
FIG. 13 is a flowchart of a method of performing an acclimation procedure in accordance with another aspect.

Referring to FIG. 13, a process 8000 for acclimating one or more library components for installation into a data storage library according to one embodiment is disclosed. While process 8000 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 13, but may be performed as an integral process, a series of steps, in the order described in or an alternative order. At 8002, at least one enclosure is provided and the enclosure is erected (or positioned) so that it surrounds at least an access opening of a data storage library (herein referred to as a library access opening), thereby forming a chamber around at least the access opening. The library access opening may comprise a movable panel for gaining access to the interior of the library for adding or removing cartridges, performing repairs, upgrades, service, etc. As described above, the at least one enclosure may enclose substantially all of the data storage library, or it may enclose only a portion of the data storage library (e.g., a side portion) and may enclose only an access opening portion of the data storage library. The time between 8002 and other steps in process 8000 may be lengthy. For example, the enclosure may be provided at the time of the initial library installation and may never be moved or removed after the initial installation. At 8004, the chamber formed by the at least one enclosure is acclimated to be at or near the external environmental conditions found outside of the data storage library. Such acclimation may be provided by providing ambient air, or air that is conditioned to create an environment similar to the ambient air, into the chamber at 8005, which may be produced by directing air from outside the data storage library and enclosure into the chamber at 8006 via, e.g., vent(s), portal(s), door(s), etc. Alternatively, and/or additionally, a dedicated enclosure environmental conditioning unit (or environmental control device) separate from any data storage library environmental conditioning unit(s) may be provided at 8007 so as to condition the air in the chamber to be at or near the external environmental conditions found outside of the data storage library. Steps 8004, 8005, 8006, and/or 8007 may be skipped or omitted if the chamber is already at or near the external environmental conditions outside of the data storage library.

At 8008, at least one library component is provided (e.g., transported, moved, positioned) for temporary storage within the chamber, where it is to be held for environmental acclimation prior to installation within the data storage library. As detailed above, the at least one library component may be, for example, one or more data storage drives, one or more data storage cartridges, one or more robot accessors, one or more power supplies, one or more library controllers, etc. At 8010, one or more access openings of the at least one enclosure (herein referred to as an enclosure access opening) may be closed, for example, by selectively moving and/or closing a movable barrier so as to form a substantially insulated, separate, isolated, and/or protected environment therein. 8010 may be optional, as some access openings may not require closing or may be self-closing, such as a split membrane, hanging slots or flaps, air curtain, etc. At 8012, the chamber formed by the at least one enclosure may be gradually acclimated to the environmental conditions of the interior of the data storage library which, in turn, enables gradual acclimation of the at least one library component contained therein. The existing environmental conditions within the chamber may dictate the source of air provided into the chamber so as to enable acclimation. For example, if the chamber is already at or near ambient exterior environmental conditions, environmentally conditioned air may be provided into the chamber at 8014. Such environmentally conditioned air may be provided to the chamber from the interior of the data storage library at 8016 via, e.g., one or more vents, one or more fans, etc. Alternatively, and/or additionally, a dedicated enclosure environmental conditioning unit (or environmental control device) separate from any data storage library environmental conditioning unit(s) may be provided so as to condition the air in the chamber at 8018. Alternatively, or additionally, air from an environmental conditioning unit associated with and for conditioning the data storage library may be directly coupled to the interior of the enclosure chamber.

At 8020, the environmental conditions within the data storage library and the at least one enclosure may be detected. As described above, the environmental conditions may be detected by, for example, one or more environmental condition sensors (e.g., temperature and/or humidity sensor(s)), the passage of time, via operator judgement, etc. At 8022, it is determined if the environmental conditions within the chamber are within a desired range of the environmental conditions within the data storage library. This determining step can be performed using the passage of time, operator judgement, or, for example, controllers and processors may be utilized in conjunction with appropriate sensors and/or timers. If no, the chamber continues to be acclimated by providing environmentally conditioned air from the library environmental conditioning unit and/or from an environmental control device into the chamber. However, if yes, the chamber may be accessed via the at least one enclosure access opening by a technician or other user at 8024. At 8026, the interior of the data storage library may then be accessed via a library access opening, and at least one acclimated library component may be provided (installed, moved, placed) into the data storage library at 8028. In a further embodiment, passage of time may be utilized to permit acclimation. The amount of time to permit acclimation may be predetermined (programmed) such as, for example, twenty-four (24) hours, and/or determined at the time of acclimation.

Figure 14:
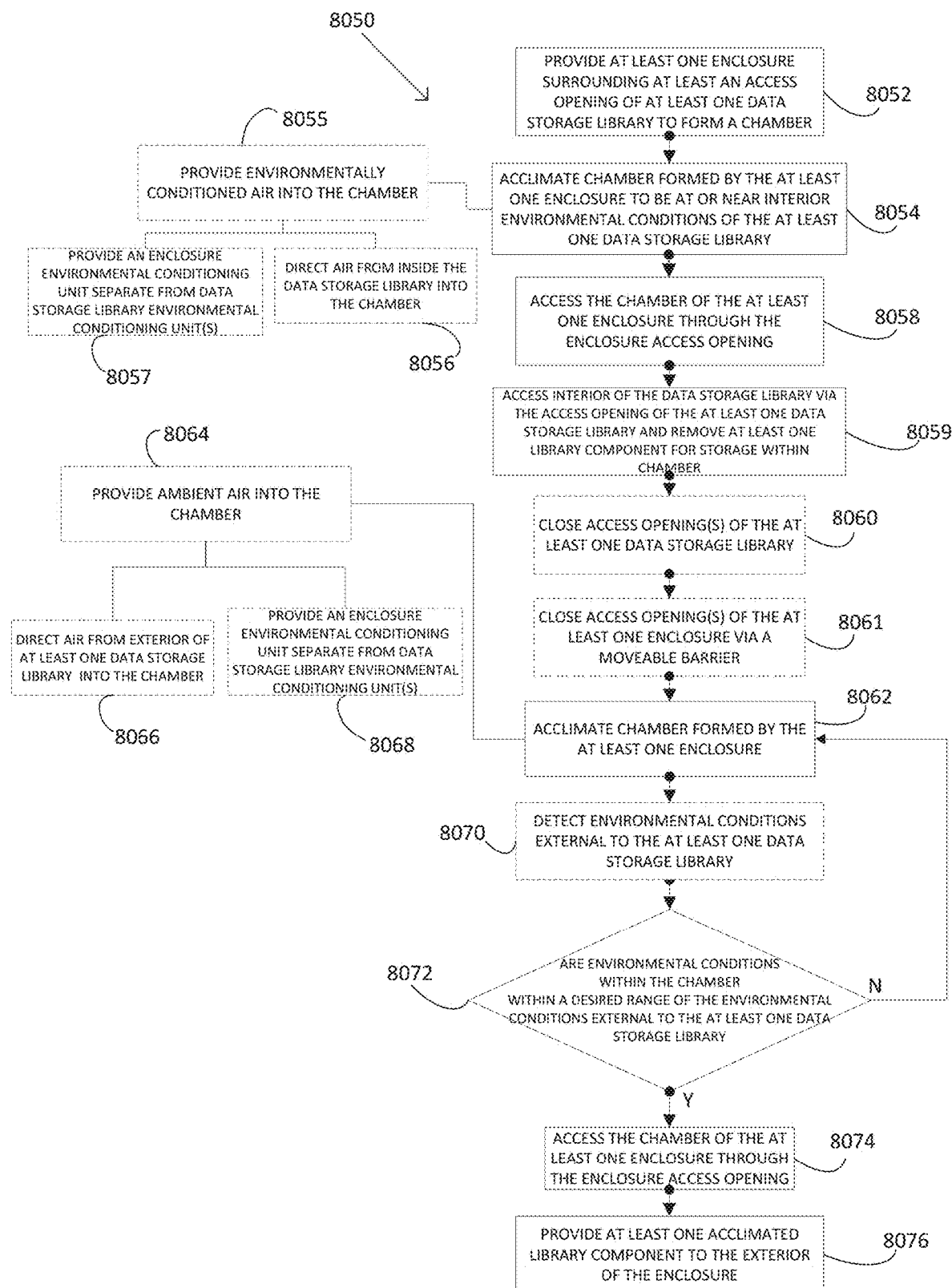
FIG. 14 is a flowchart of a method of performing an acclimation procedure in accordance with another aspect.

Referring to FIG. 14, a process 8050 for acclimating one or more library components for removal from a data storage library according to one embodiment is disclosed. While process 8050 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 14, but may be performed as an integral process, a series of steps, in the order described in or an alternative order. At 8052, at least one enclosure is provided and the enclosure is erected (or positioned) so that it surrounds at least an access opening of a data storage library, thereby forming a chamber around at least the library access opening. The library access opening may comprise a movable panel for gaining access to the interior of the library for adding or removing cartridges, performing repairs, upgrades, service, etc. As described above, the at least one enclosure may enclose substantially all of the data storage library, or it may enclose only a portion of the data storage library (e.g., a side portion) and may enclose only an access opening portion of the data storage library. The time frame between 8052 and other steps in process 8050 may be very large. For example, the enclosure may be provided at the time of the initial library installation and may never be moved or removed after the initial installation. At 8054, the chamber formed by the at least one enclosure is acclimated to be at or near the conditioned environment found inside the data storage library. Such acclimation may be provided by providing environmentally conditioned air into the chamber at 8055, which may be produced by directing air from inside the data storage library into the chamber at 8056 via, e.g., vent(s), portal(s), door(s), etc. Alternatively, and/or additionally, a dedicated enclosure environmental conditioning unit (environmental control device) separate from any data storage library environmental conditioning unit(s) may be provided at 8057 so as to condition the air in the chamber to be at or near the environmental conditions found inside the data storage library. Alternatively, or additionally, air from an environmental conditioning unit associated with and for conditioning the data storage library may be directly coupled to the interior of the enclosure chamber. Steps 8054, 8055, 8056, and/or 8057 may be skipped or omitted if the chamber is already at or near the conditioned environment found inside the data storage library.

At 8058, a technician or user accesses the chamber via an enclosure access opening. At 8059, the interior of the data storage library may then be accessed via a library access opening, and at least one acclimated library component may be removed from the library and provided (e.g., transported, moved, positioned) for temporary storage within the chamber, where it is to be held for environmental acclimation prior to removal from the chamber. As detailed above, the at least one library component may be, for example, one or more data storage drives, one or more data storage cartridges, one or more robot accessors, one or more power supplies, one or more library controllers, etc. At 8060, one or more access openings of the data storage library may be closed. At 8061, one or more access openings of the at least one enclosure may be closed, for example, by selectively moving and/or closing a movable barrier so as to form a substantially insulated, separate, isolated, and/or protected environment therein. 8060 and/or 8061 are optional because some access doors may not require closing or may be self-closing, such as a split membrane, hanging slots or flaps, air curtain, etc. At 8062, the chamber formed by the at least one enclosure may be gradually acclimated to be at or near the external environmental conditions found outside of the data storage library which, in turn, enables gradual acclimation of the at least one library component contained therein. The existing environmental conditions within the chamber may dictate the source of air provided into the chamber so as to enable acclimation. For example, if the chamber is already at or near conditioned internal environmental conditions, ambient air, or air that is conditioned to create an environment similar to the ambient air, may be provided into the chamber at 8064. Such ambient air may be provided to the chamber from the exterior of the data storage library at 8066 via, e.g., one or more vents, one or more fans, etc. Alternatively, and/or additionally, a dedicated enclosure environmental conditioning unit (environmental control device) separate from any data storage library environmental conditioning unit(s) may be provided so as to condition the air in the chamber at 8068.

At 8070, the external environmental conditions found outside of the data storage library may be detected. As described above, the environmental conditions may be detected by, for example, one or more environmental condition sensors (e.g., temperature and/or humidity sensor(s)), the passage of time, via operator judgement, etc. At 8072, it is determined if the environmental conditions within the chamber are within a desired range of the environmental conditions found outside of the data storage library. This determining step can be performed using the passage of time, operator judgement, or, for example, controllers and/or processors may be utilized in conjunction with appropriate sensors and/or timers. If no, the chamber continues to be acclimated by providing ambient air, from outside (or the exterior of) the data storage library and/or from an environmental control device, into the chamber. However, if yes, the chamber may be accessed via an enclosure access opening by a technician or other user at 8074. At 8076, the at least one acclimated component may be provided to the exterior of the enclosure via an enclosure access opening (i.e., it is removed from the enclosure). In a further embodiment, passage of time may be utilized to permit acclimation. The amount of time to permit acclimation may be predetermined (programmed) such as, for example, twenty-four (24) hours, and/or determined at the time of acclimation.

Figure 15:
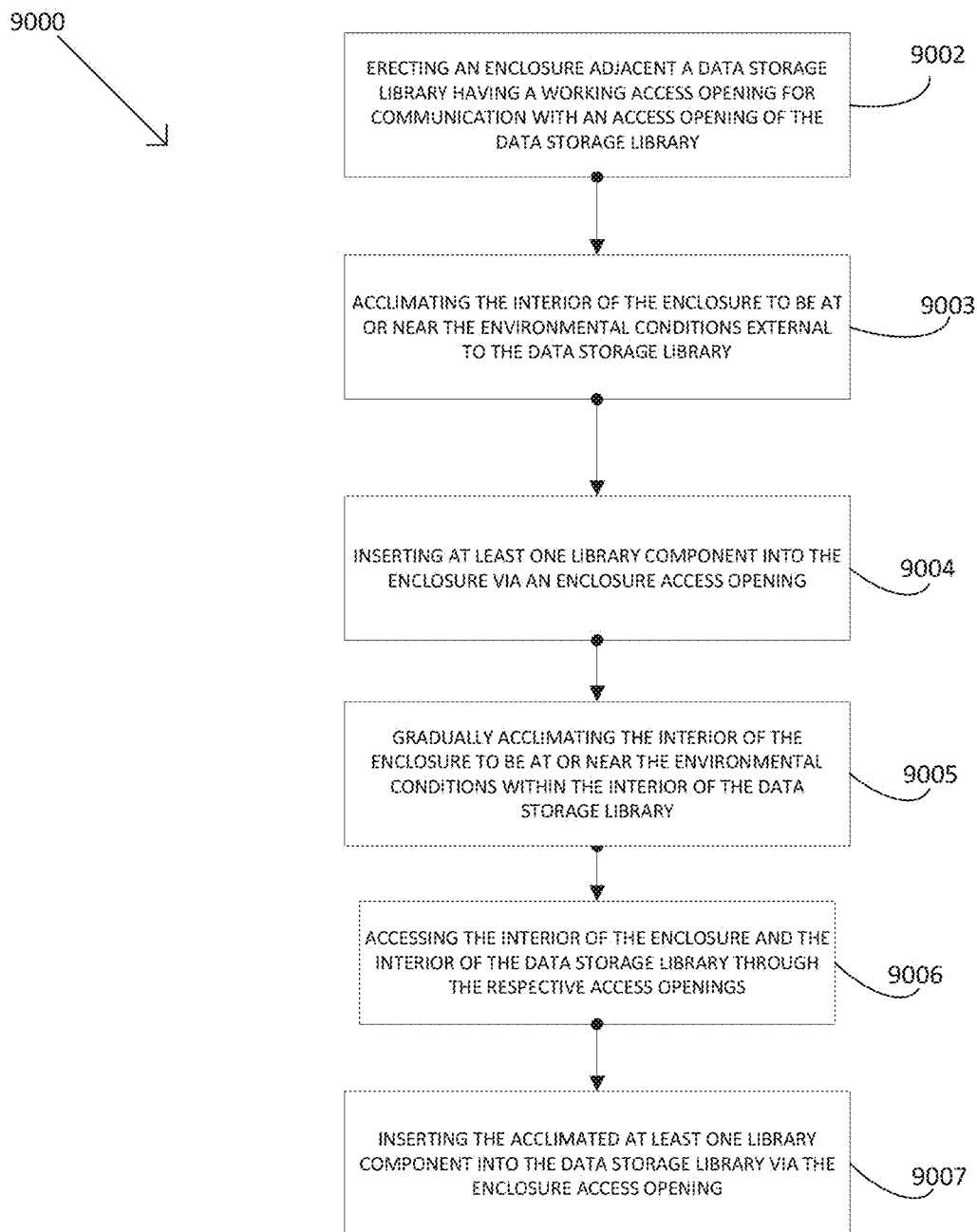
FIG. 15 is a flowchart of a method of performing an acclimation procedure in accordance with another aspect.

Referring to FIG. 15, a process 9000 for acclimating one or more library components for installation into a data storage library according to one embodiment is disclosed. While process 9000 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 15, but may be performed as an integral process, a series of steps, in the order described in or an alternative order. At 9002, an enclosure is erected or positioned adjacent to a data storage library, wherein the enclosure has a working access opening configured for communication with an access opening of the data storage library. Next, at 9003, the interior of the enclosure is acclimated such that the environmental conditions within the enclosure are at or near the environmental conditions external to the data storage library. Acclimation may be performed by any appropriate means, such as one or more of waiting a predetermined period of time, utilizing air provided into the enclosure from the exterior environment, utilizing air provided into the enclosure from the interior of the data storage library, utilizing air from an environmental conditioning unit, etc. The environmental conditioning unit may be at least one of an environmental conditioning unit associated with the data storage library, a separate environmental conditioning unit configured to condition the air in the enclosure or to vent conditioned air into the enclosure, and an environmental control device (e.g., a thermoelectric heater, a thermoelectric cooler, etc.) within the enclosure itself.

At 9004, the interior of the enclosure is accessed and at least one library component is provided (inserted, moved, placed) into the enclosure via an enclosure access opening. At 9005, the interior of the enclosure is then gradually acclimated to be at or near the environmental conditions found within the interior of the data storage library such that the one or more library components are gradually acclimated to the environmental conditions within the data storage library. Next, at 9006, the interior of the enclosure is accessed, and the interior of the data storage library is accessed through their respective access openings. The acclimated at least one library component is then provided (inserted, installed, moved, placed into its appropriate location within the data storage library via an access opening of the data storage library at 9007.

Figure 16:
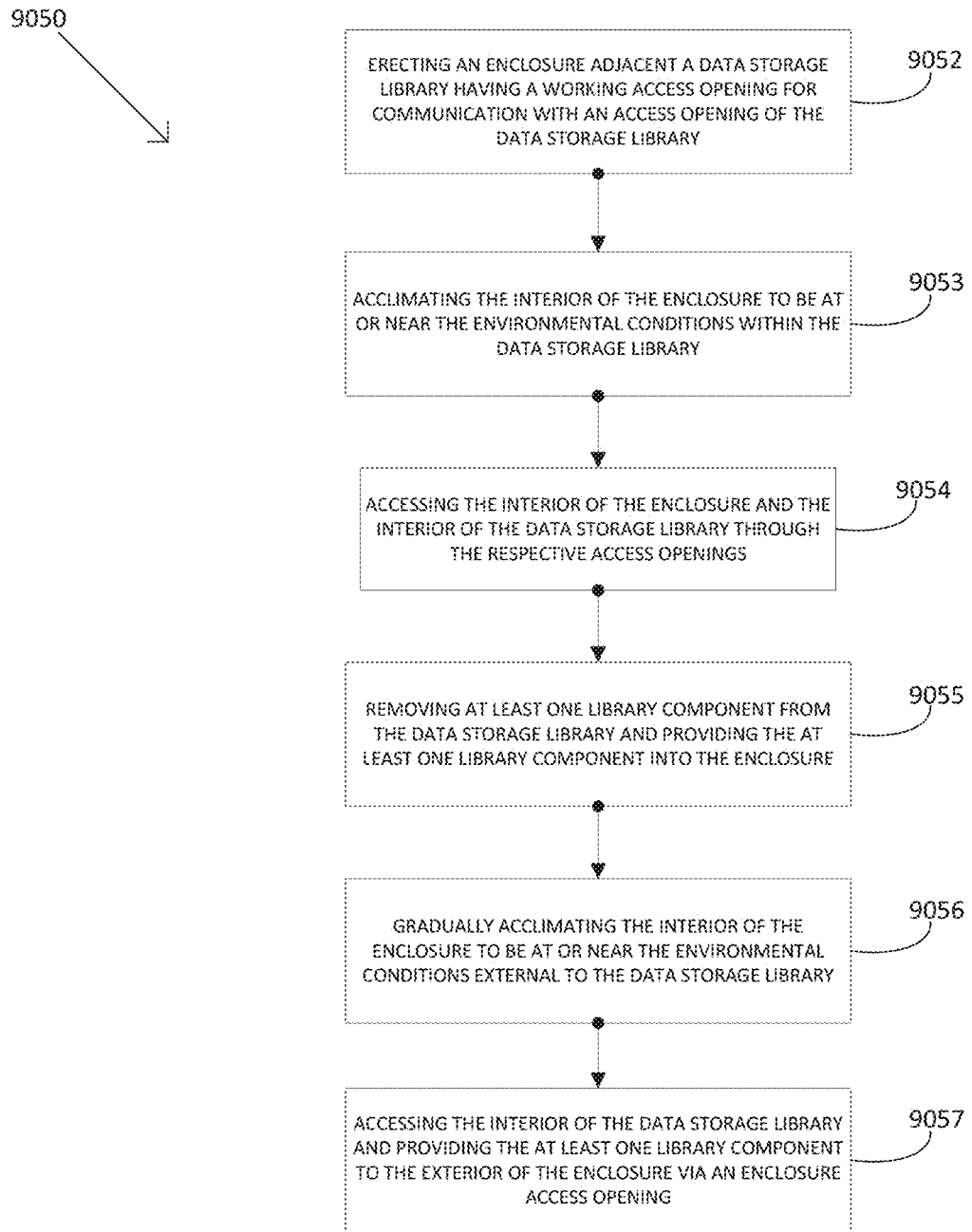
FIG. 16 is a flowchart of a method of performing an acclimation procedure in accordance with another aspect.

Referring to FIG. 16, a process 9050 for acclimating one or more library components for installation into a data storage library according to one embodiment is disclosed. While process 9050 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 16, but may be performed as an integral process, a series of steps, in the order described in or an alternative order. At 9052, an enclosure is erected or positioned adjacent to a data storage library, wherein the enclosure has a working access opening configured for communication with an access opening of the data storage library. Next, at 9053, the interior of the enclosure is acclimated such that the environmental conditions within the enclosure are at or near the environmental conditions within the data storage library. Acclimation may be performed by any appropriate means, such as one or more of waiting a predetermined period of time, utilizing air provided into the enclosure from the exterior environment, utilizing air provided into the enclosure from the interior of the data storage library, utilizing air from an environmental conditioning unit, etc. The environmental conditioning unit may be at least one of an environmental conditioning unit associated with the data storage library, a separate environmental conditioning unit configured to condition the air in the enclosure or to vent conditioned air into the enclosure, or an environmental control device (e.g., a thermoelectric heater, a thermoelectric cooler, etc.) within the enclosure itself.

At 9054, the interior of the enclosure is accessed, and the interior of the data storage library is accessed through their respective access openings. At 9055, at least one library component is removed from the data storage library and is provided (moved, inserted, positioned) into the enclosure. At 9056, the interior of the enclosure is acclimated such that the environmental conditions within the enclosure are at or near the environmental conditions external to the data storage library such that the one or more library components are gradually acclimated to the environmental conditions external to the data storage library. Next, at 9057, the interior of the enclosure is accessed, and the acclimated at least one library component is then provided to the exterior of the enclosure via an enclosure access opening (e.g., the at least one library component is removed from the enclosure).

It follows that various embodiments described and/or suggested herein are able to provide data storage systems, and optionally, automated data storage libraries having environmental conditioning/control capabilities associated with the automated data storage library, with at least one enclosure capable of providing an environmentally-controlled access point. As a result, favorable conditions (e.g., temperature, humidity, absence of contaminants, etc.) may be maintained for the data storage drives, data storage cartridges, and/or data storage media which may be provided in the library frame, even during service procedures in which the access door(s) or panel(s) of the library frame must be opened. Undesirable environmental conditions (e.g., condensation formation and/or accumulation on the media, and its subsequent effect on contacting devices) may also be impeded, resisted, and/or inhibited and preferably avoided. Inhibiting and substantially avoiding the formation and accumulation of condensation and moisture may be particularly beneficial for tape libraries, tape cartridges and tape media. Moreover, a data storage library may be maintained at an appropriate temperature, humidity, contaminant level, etc. regardless of whether the library is installed in unfavorable (e.g., hot and/or wet) conditions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An enclosure configured to surround at least one library access opening that permits access to an interior of a data storage library cabinet having at least one environmental conditioning unit within at least one environmental conditioning unit container, the enclosure comprising:
    a plurality of side wall panels configured to surround one or more sides of the data storage library cabinet and the at least one library access opening, wherein the plurality of side wall panels are configured to permit access to the at least one library access opening of the data storage library cabinet;
    at least one top panel coupled to at least one of the plurality of side wall panels;
    a plurality of top side panels extending up from one or more of the plurality of side wall panels, wherein the plurality of side wall panels, the at least one top panel, and the plurality of top side panels collectively are configured to form a chamber around the data storage library cabinet; and
    at least one enclosure access opening in the at least one of the plurality of side wall panels to permit access to an interior of the chamber;
    wherein the enclosure is configured to selectively permit environmental conditions within the chamber to acclimate between environmental conditions outside the enclosure and environmental conditions within the data storage library cabinet; and
    wherein one or more of the plurality of side wall panels, the at least one top panel, and the plurality of top side panels collectively are configured such that waste air generated by the at least one environmental conditioning unit is not captured within the enclosure.

2. The enclosure of claim 1, further comprising at least one vent formed in at least one of the plurality of side wall panels, wherein the at least one vent is separate from the at least one enclosure access opening, and configured to selectively allow ambient external air from outside the enclosure to intrude into the chamber.

3. The enclosure of claim 2, wherein the at least one vent is selectively openable and closable.

4. The enclosure of claim 1, further comprising at least one environmental control device associated therewith, wherein the at least one environmental control device is configured to acclimate the environmental conditions within the chamber toward at least one of environmental conditions outside of the enclosure and environmental conditions within the data storage library cabinet.

5. The enclosure of claim 4, wherein the at least one environmental control device comprises at least one of a fan, air conditioner, thermoelectric heater, thermoelectric cooler, electric heater, liquid heater, liquid cooler, heat pump, evaporative cooler, ionizer, deionizer, humidifier, dehumidifier.

6. The enclosure of claim 1, wherein the plurality of side wall panels, the plurality of top side panels, and the at least one top panel are formed of at least one flexible material.

7. The enclosure of claim 1, wherein the enclosure further comprises a collapsible frame structure.

8. The enclosure of claim 1, further comprising at least one environmental sensor for detecting and measuring at least one of temperature, humidity, and combinations thereof.

9. The enclosure of claim 1, further comprising at least one indicator to indicate a state of environmental acclimation within the chamber, wherein the at least one indicator is configured to provide at least one of the group of a visual indication, an audible indication and combinations thereof.

10. A system comprising:
    a data storage library, wherein the data storage library is configured to receive one or more data storage cartridges, and further wherein the data storage library comprises a cabinet having at least one library access opening for accessing an interior of the data storage library cabinet, at least one library vent in the data storage library cabinet that is selectively openable and closeable for selectively allowing conditioned air from within the data storage library to be communicated externally of the data storage library cabinet, and a movable panel associated with and for covering the at least one library access opening, and;
    at least one environmental conditioning unit associated with the data storage library cabinet and configured to control at least one environmental condition within the data storage library cabinet;
    at least one environmental conditioning unit container configured to house the at least one environmental conditioning unit; and
    a data storage library enclosure configured to at least partially surround the data storage library cabinet and provide a barrier to environmental conditions external to the data storage library cabinet from intruding into the data storage library, wherein the data storage library enclosure comprises:
        a plurality of side wall panels configured to surround sides of the data storage library cabinet and the at least one library access opening, wherein the side walls are configured to permit access to the at least one library access opening of the data storage library;
        at least one top panel coupled to at least one of the plurality of side wall panels;
        a plurality of top side panels extending up from one or more of the plurality of the side wall panels, wherein the plurality of side wall panels, the at least one top panel, and the plurality of top side panels collectively are configured to form a chamber around the data storage library cabinet;
        at least one enclosure access opening in the at least one of the plurality of side wall panels to permit access to an interior of the chamber; and
        at least one enclosure vent formed in at least one of the plurality of side wall panels, wherein the at least one enclosure vent is separate from the at least one enclosure access opening, and further wherein the at least one vent is configured to selectively allow ambient external air from outside the enclosure to intrude into the chamber, wherein one or more of the plurality of side wall panels, the at least one top panel, and the plurality of top side panels collectively are configured such that waste heat generated by the at least one environmental conditioning unit is not captured within the data storage library enclosure.

11. The system of claim 10, wherein the at least one enclosure vent is selectively openable and closable.

12. The system of claim 10, further comprising at least one environmental control device associated therewith, wherein the at least one environmental control device is configured to acclimate the environmental conditions within the chamber toward at least one of environmental conditions outside of the enclosure and environmental conditions within the data storage library.

13. The system claim 12, wherein the at least one environmental control device comprises at least one of a fan, air conditioner, thermoelectric heater, thermoelectric cooler, electric heater, liquid heater, liquid cooler, heat pump, evaporative cooler, ionizer, deionizer, humidifier, dehumidifier.

14. The system of claim 10, wherein the plurality of side wall panels, the plurality of top side panels, and the at least one top panel are formed of at least one flexible material.

15. The system of claim 10, wherein the enclosure further comprises a collapsible frame structure.

16. The system of claim 10, further comprising at least one environmental sensor for detecting and measuring at least one of temperature, humidity, and combinations thereof.

17. The system of claim 10, further comprising at least one indicator to indicate a state of environmental acclimation within the chamber, wherein the at least one indicator is configured to provide at least one of the group of a visual indication, an audible indication and combinations thereof.

18. An enclosure configured to surround at least one library access opening that permits access to an interior of a data storage library cabinet having at least one environmental conditioning unit within at least one environmental conditioning unit container, the enclosure comprising:

a plurality of side wall panels configured to surround one or more sides of the data storage library cabinet and the at least one library access opening, wherein the plurality of side wall panels are configured to permit access to the at least one library access opening of the data storage library cabinet;

at least one top panel coupled to at least one of the plurality of side wall panels; and a plurality of top side panels extending up from one or more of the plurality of side wall panels;

wherein the plurality of side wall panels, the at least one top panel, and the plurality of top side panels collectively are configured in conjunction with at least a portion of the environmental conditioning unit container to form a chamber around the data storage library cabinet, wherein the enclosure is configured to selectively permit environmental conditions within the chamber to acclimate between environmental conditions outside the enclosure and environmental conditions within the interior of the data storage library cabinet; and wherein the plurality of side wall panels, the at least one top panel, and the plurality of top side panels collectively are configured such that waste air generated by at least one environmental conditioning unit is not captured within the enclosure, wherein the enclosure further comprises:

at least one enclosure access opening in at least one of the plurality of side wall panels to permit access to an interior of the chamber; and at least one vent formed in at least one of the plurality of side wall panels, wherein the at least one vent is separate from the at least one enclosure access opening, and configured to selectively open and close to selectively allow ambient external air from outside the enclosure to intrude into the chamber.

19. The enclosure of claim 18, further comprising at least one environmental control device associated therewith, wherein the at least one environmental control device is configured to acclimate the environmental conditions within the chamber toward at least one of environmental conditions outside of the enclosure and environmental conditions within the interior of the data storage library cabinet, and wherein the at least one environmental control device comprises at least one of a fan, air conditioner, thermoelectric heater, thermoelectric cooler, electric heater, liquid heater, liquid cooler, heat pump, evaporative cooler, ionizer, deionizer, humidifier, dehumidifier.

20. The enclosure of claim 18, wherein the enclosure comprises a collapsible frame structure and the plurality of side wall panels, the plurality of top side panels, and the at least one top panel are formed of at least one flexible material.

* * * * *